United States Patent
Rajagopalan et al.

(10) Patent No.: US 11,431,652 B2
(45) Date of Patent: Aug. 30, 2022

(54) AUTOMATED MULTI-FABRIC LINK AGGREGATION SYSTEM

(71) Applicant: Dell Products L.P., Round Rock, TX (US)

(72) Inventors: Balaji Rajagopalan, Sunnyvale, CA (US); Pawan Kumar Singal, Milpitas, CA (US); Joseph LaSalle White, San Jose, CA (US); Kevin K. Matsuo, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 32 days.

(21) Appl. No.: 16/946,908

(22) Filed: Jul. 10, 2020

(65) Prior Publication Data
US 2022/0014481 A1  Jan. 13, 2022

(51) Int. Cl.
*H04L 49/15* (2022.01)
*H04L 49/90* (2022.01)
*H04L 49/1515* (2022.01)
*H04L 49/10* (2022.01)

(52) U.S. Cl.
CPC .......... *H04L 49/1507* (2013.01); *H04L 49/10* (2013.01); *H04L 49/1523* (2013.01); *H04L 49/9063* (2013.01)

(58) Field of Classification Search
CPC . H04L 49/1507; H04L 49/10; H04L 49/1523; H04L 49/9063
See application file for complete search history.

(56) References Cited

U.S. PATENT DOCUMENTS

| | | | |
|---|---|---|---|
| 9,059,909 B2 | 6/2015 | Velayudhan et al. | |
| 9,413,602 B2 | 8/2016 | Mohandas et al. | |
| 2007/0133618 A1* | 6/2007 | Brolin | H04L 45/16 370/514 |
| 2009/0109998 A1* | 4/2009 | Vinayagam | H04L 41/0886 370/465 |
| 2011/0280572 A1* | 11/2011 | Vobbilisetty | H04L 49/65 398/45 |
| 2012/0127853 A1* | 5/2012 | Tatsumi | H04L 49/557 370/217 |

(Continued)

*Primary Examiner* — Shah M Rahman
(74) *Attorney, Agent, or Firm* — Joseph Mencher

(57) ABSTRACT

An automated multi-fabric link aggregation system includes leaf switch devices that have leaf switch device downlink ports, that are included in a first network fabric, and that are aggregated to provide a first aggregation fabric. Each leaf switch device generates discovery communications including a first network fabric identifier for the first network fabric, and a first aggregation fabric identifier for the first aggregation fabric. The leaf switch devices then transmit the discovery communications via the leaf switch device downlink ports. I/O modules that have I/O module uplink port are included in a second network fabric and are aggregated to provide a second aggregation fabric. The I/O modules receive the discovery communications via each of the I/O module uplink ports, determine that each received discovery communication includes the first network fabric identifier and the first aggregation fabric identifier and, in response, automatically configure the I/O module uplink ports in a LAG.

20 Claims, 17 Drawing Sheets

(56) References Cited

U.S. PATENT DOCUMENTS

| | | | | |
|---|---|---|---|---|
| 2012/0266013 A1* | 10/2012 | Shannon | ............... | H04L 41/08 |
| | | | | 714/4.2 |
| 2012/0275297 A1* | 11/2012 | Subramanian | ........ | H04L 45/245 |
| | | | | 370/389 |
| 2013/0315097 A1* | 11/2013 | Yang | ................ | H04L 41/0886 |
| | | | | 370/254 |
| 2014/0050217 A1* | 2/2014 | Janakiraman | ........... | H04L 45/74 |
| | | | | 370/389 |
| 2014/0355477 A1* | 12/2014 | Velayudhan | ........ | H04L 41/0806 |
| | | | | 370/254 |
| 2015/0103829 A1* | 4/2015 | Tatsumi | ............. | H04L 49/3009 |
| | | | | 370/392 |
| 2016/0254956 A1* | 9/2016 | Xu | .................... | H04L 41/0886 |
| | | | | 370/255 |
| 2016/0277214 A1* | 9/2016 | Guntaka | ............ | H04L 41/0803 |
| 2016/0277318 A1* | 9/2016 | Guntaka | ............ | H04L 41/0813 |
| 2016/0315964 A1* | 10/2016 | Shetty | ................ | H04L 63/168 |
| 2016/0330141 A1* | 11/2016 | Vobbilisetty | ........... | H04L 45/66 |
| 2017/0063637 A1* | 3/2017 | Kashyap | ............... | H04L 41/12 |
| 2017/0078150 A1* | 3/2017 | Koganti | ............. | H04L 12/4633 |
| 2017/0155599 A1* | 6/2017 | Vobbilisetty | ........ | H04L 41/0816 |
| 2017/0163569 A1* | 6/2017 | Koganti | ................. | H04L 49/25 |
| 2017/0257309 A1* | 9/2017 | Appanna | ............ | H04L 12/4641 |
| 2019/0068401 A1* | 2/2019 | Johnsen | ................ | H04L 45/24 |
| 2019/0230026 A1* | 7/2019 | Jailani | .................. | H04L 41/046 |
| 2019/0230043 A1* | 7/2019 | Kommula | ............ | H04L 47/726 |
| 2019/0379572 A1* | 12/2019 | Yadav | ................ | H04L 12/4625 |
| 2021/0160318 A1* | 5/2021 | Sajeepa | ............... | G06F 11/1068 |
| 2021/0385149 A1* | 12/2021 | Suryanarayana | ..... | H04L 45/586 |

* cited by examiner

AUTOMATED MULTI-FABRIC LINK AGGREGATION SYSTEM

BACKGROUND

The present disclosure relates generally to information handling systems, and more particularly to aggregating links provided between information handling systems in different network fabrics.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, primary Input/Output (I/O) modules and leaf switch devices, are sometimes connected together while being provided in different network fabrics. For example, primary (I/O) modules may be provided in a first network fabric that includes server devices that are connected to those primary I/O modules directly and/or via secondary I/O modules in the first network fabric. Furthermore, leaf switch devices may be provided in a second network fabric that includes spine switch devices, and the leaf switch devices may be connected to the primary I/O modules in order to connect the first network fabric and second network fabric and allow the server devices to communicate with each other and/or over a network. In some embodiments, a first fabric manager system such as, for example, a Smart Fabric Services (SFS) fabric manager system available in switch devices and primary (I/O) modules available from DELL® Inc. of Round Rock, Tex., United States, may operate in primary I/O module(s) to provide management functionality for the first network fabric (e.g., an first SFS domain for a first SFS manager system), while a second fabric manager system may operate in leaf switch device(s) to provide management functionality for the second network fabric (e.g., a second SFS domain for a second SFS manager system). However, the operation of such fabric manager systems can cause issues in some situations.

For example, in many situations, it may be desirable to aggregate leaf switch devices and primary I/O modules that are connected to each other. For example, the Virtual Link Trunking (VLT) protocol (available in switch devices and primary (I/O) modules available from DELL® Inc. of Round Rock, Tex., United States) is a Layer-2 (L2) link aggregation protocol that provides redundant, load balancing connections between devices in a loop-free environment while eliminating the need to utilize the Spanning Tree Protocol, and may be utilized with the primary I/O modules in order to aggregate those primary I/O modules such that they appear to connected devices as a single, logical primary I/O module, as well as with the leaf switch devices in order to aggregate those leaf switch devices such that they appear to connected devices as a single, logical leaf switch device. As such, a pair of primary I/O modules may be aggregated such that they are provided in a first aggregation fabric (e.g., a first VLT fabric), and a pair of leaf switch devices that are connected to that pair of primary I/O modules may be aggregated such that are provided in a second aggregation fabric (e.g., a second VLT fabric), and one of skill in the art in possession of the present disclosure will appreciate that the aggregations of the primary I/O modules and leaf switch devices discussed above require that uplink ports on those primary I/O modules and the downlink ports on those leaf switch devices that are connected (e.g., via cabling) to provide the links between them be configured in Link Aggregation Groups (LAGs) (also called "VLT port channels" in the VLT protocol.)

However, the fabric manager systems operating in the primary I/O module(s) and leaf switch device(s) discussed above will not initiate the configuration of a LAG on its ports, as those ports are configured in a passive mode (e.g., a passive Link Aggregation Control Protocol (LACP) mode), and those fabric manager systems are instead configured to wait until a LAG is detected on the ports that are connected to its ports via the links before it begins configuring its ports in a LAG. As such, the aggregated primary I/O modules in the first network fabric will wait to configure LAGs on its uplink ports until the downlink ports on the aggregated leaf switch devices in the second network fabric are detected as having been configured in a LAG, and the aggregated leaf switch devices in the second network fabric will wait to configure LAGs on its downlink ports until the uplink ports on the primary I/O modules in the first network fabric are detected as having been configured in a LAG. Thus, a user is required to manually configure a LAG on either the uplink ports on the aggregated primary I/O modules or the downlink ports on the aggregated leaf switch devices in order to provide the connection between the first network fabric and second network fabric, which is time-consuming, error-prone, and operates to interrupt what would otherwise be an automated configuration of the connection between the first network fabric and the second network fabric.

Accordingly, it would be desirable to provide an automated multi-fabric link aggregation system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an Input/Output (I/O) module engine that is configured to: receive, via each of a plurality of I/O module uplink ports that are connected to respective leaf switch device downlink ports on a plurality of leaf switch devices, first discovery communications from the plurality of leaf switch devices; determine that each first discovery communication received via each of the plurality of I/O module uplink ports includes: a first network fabric identifier that identifies a first network fabric that includes the plurality of leaf switch devices; and a first aggregation fabric identifier that identifies a first aggregation fabric that includes the plurality of leaf switch devices; and automatically configure, in response to determining that each first discovery communication received via each of the plurality of I/O module uplink ports includes the first network fabric identifier and the first aggregation fabric identifier, the plurality of I/O module uplink ports in a first Link Aggregation Group (LAG).

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
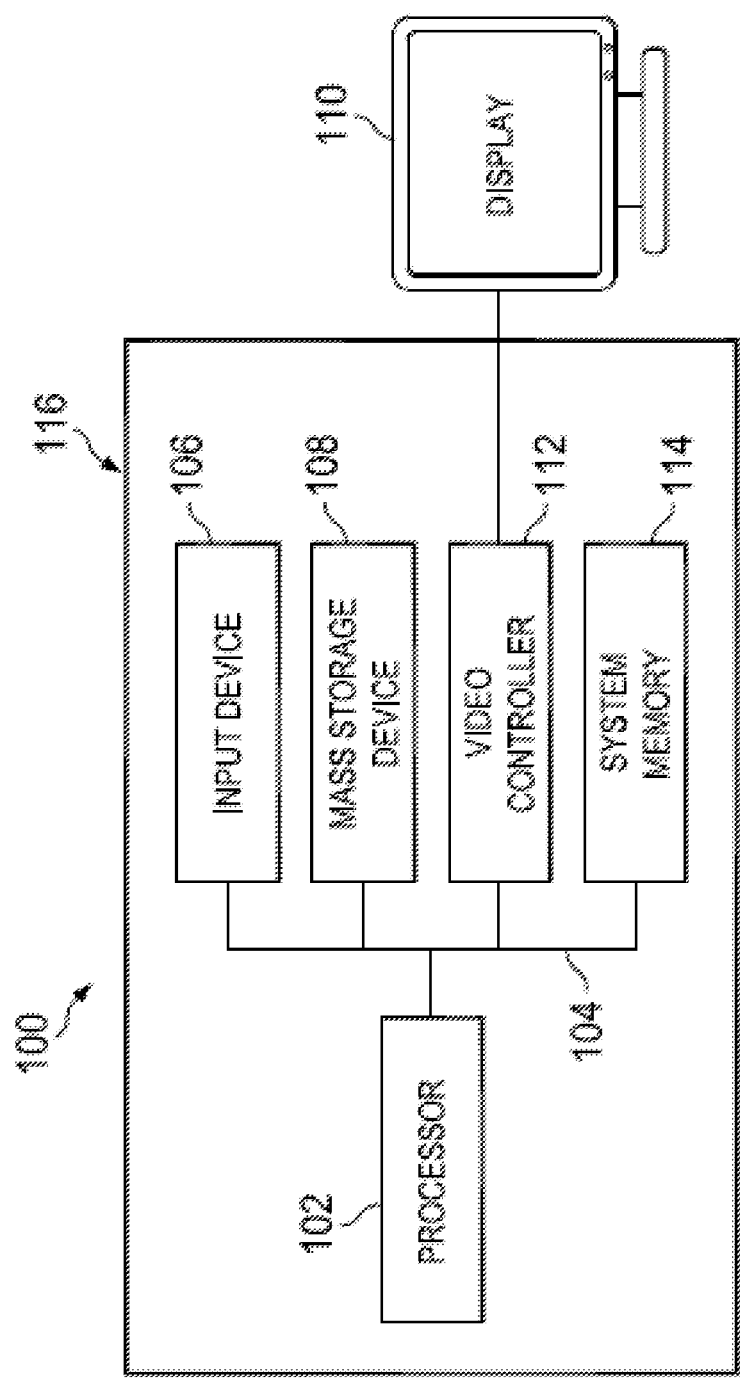
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
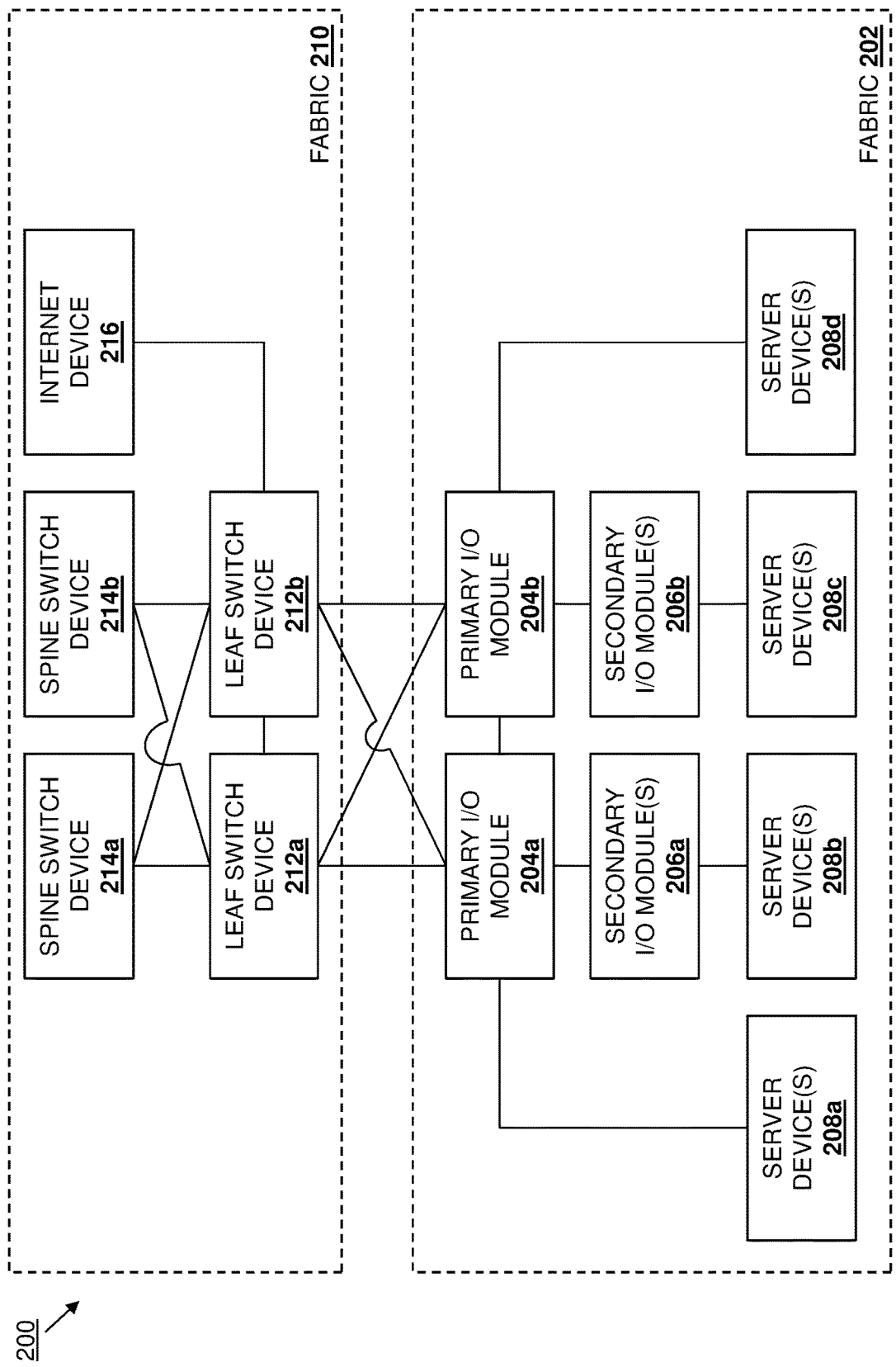
FIG. 2 is a schematic view illustrating an embodiment of an automated multi-fabric link aggregation system.

Referring now to FIG. 2, an embodiment of an automated multi-fabric link aggregation system 200 is illustrated. In the illustrated embodiment, the automated multi-fabric link aggregation system 200 includes a fabric 202 having a plurality of primary Input/Output (I/O) modules 204a and 204b. However, while only two primary I/O modules are illustrated and discussed below, one of skill in the art in possession of the present disclosure will appreciate that that automated multi-fabric link aggregation system 200 may include more or fewer primary I/O modules while remaining within the scope of the present disclosure as well. In an embodiment, either or both of the primary I/O modules 204a and 204b may be provided by the IHS 100 discussed above with reference to FIG. 1, and/or may include some or all of the components of the IHS 100. In a specific example, either or both of the primary I/O modules 204a and 204b may be provided by a DELL® EMC® networking MX9116n fabric switching engine switch device, available from DELL® Inc. of Round Rock, Tex., United States. One of skill in the art in possession of the present disclosure will appreciate that the primary I/O modules 204a and 204b may be provided by "full-function" I/O modules that include an operating system and that may be configured to perform any of a variety of I/O module functions known in the art in handling server device communications, discussed in further detail below, and in specific examples may include networking hardware providing networking functions capable of supporting the secondary I/O modules discussed below that are coupled to them via double-density connections. However, while illustrated and discussed as being provided by particular type/functionality I/O modules, one of skill in the art in possession of the present disclosure will recognize that the automated multi-fabric link aggregation system 200 may include any devices that may be configured to operate similarly as the primary I/O modules 204a and 204b discussed below.

In the illustrated embodiment, the fabric 202 in the automated multi-fabric link aggregation system 200 also includes one or more secondary I/O modules 206a coupled to the primary I/O module 204a, and one or more secondary I/O modules 206b coupled to the primary I/O module 204b. For example, each secondary I/O module may be coupled to one of the primary I/O modules 204a and 204b via an aggregated link (e.g., a VLT port channel in the VLT protocol), and one of skill in the art in possession of the present disclosure will appreciate that each primary I/O module 204a and 204b may typically be coupled to between 1-9 secondary I/O modules, while being capable of coupling to up to 12 secondary I/O modules. In an embodiment, any or all of the secondary I/O modules 206a-206b may be provided by the IHS 100 discussed above with reference to FIG. 1, and/or may include some or all of the components of the IHS 100. In a specific example, any or all of the secondary I/O modules 206a-206b may be provided by a DELL® MX7108 expander module, available from DELL® Inc. of Round Rock, Tex., United States.

One of skill in the art in possession of the present disclosure will appreciate that the secondary I/O modules 206a-206b may be provided to enable their connected primary I/O module to couple to additional server devices (discussed in further detail below) and, as such, may not include an operating system, and may not be configured to perform many (or all of) the variety of I/O module functions performed by the primary I/O modules 204a and 204b, discussed in further detail below, and in specific examples may and electrical pass-through device connected via double-density connections to the primary I/O modules discussed above. However, while illustrated and discussed as being provided by particular type/functionality I/O modules, one of skill in the art in possession of the present disclosure will recognize that the automated multi-fabric link aggregation system 200 may include any devices that may be configured to operate similarly as the secondary I/O modules 206a-206b discussed below.

In the illustrated embodiment, the fabric 202 in the automated multi-fabric link aggregation system 200 also includes one or more server devices 208a coupled to the primary I/O module 204a, one or more server devices 208b coupled to one or more of the secondary I/O modules 206a, one or more server devices 208c coupled to one or more of the secondary I/O modules 206b, and one or more server devices 208d coupled to the primary I/O module 204b. In an embodiment, any or all of the server devices 208a-208d may be provided by the IHS 100 discussed above with reference to FIG. 1, and/or may include some or all of the components of the IHS 100. However, while illustrated and discussed as being provided by server devices, one of skill in the art in possession of the present disclosure will recognize that the port configuration migration system 200 may include any devices that may be configured to operate similarly as the server devices 208a-208d discussed below.

As will be appreciated by one of skill in the art in possession of the present disclosure, in a specific example, pairs of the primary I/O modules (e.g., the pair of primary I/O modules 204a/204b) may be provided in a respective rack chassis (e.g., a "primary I/O module rack chassis") such that each primary I/O module rack chassis houses two primary I/O modules. Furthermore, each primary I/O module rack chassis that houses a pair of primary I/O modules may also house server devices that are directly connected to those primary I/O modules (e.g., the server devices 208a and 208d directly connected to the primary I/O modules 204a and 204b, respectively. However, one of skill in the art in possession of the present disclosure will recognize that each primary I/O module rack chassis may be limited to housing a maximum number of server devices (e.g., 8 server devices in many conventional rack chassis), while each of the primary I/O modules may be configured to handle communications from many more server devices.

Furthermore, each secondary I/O module may be provided in a respective rack chassis (e.g., a "secondary I/O module rack chassis") with the server devices 208b-208c (e.g., 8 server devices in each rack chassis) that are connected to that secondary I/O module, and each secondary I/O module is connected to one of the primary I/O modules (which is housed in primary I/O module rack chassis) in order to couple the server devices in its secondary I/O module rack chassis to a primary I/O module. As discussed above, the primary I/O module may be a "full-function" I/O module that includes an operating system and that may be configured to perform a variety of I/O module functions for any server device (e.g., that is directly connected to that primary I/O module, or that is coupled to that primary I/O module by a secondary I/O module), while the secondary I/O modules do not include an operating system and are not configured to perform many (or all) of the variety of I/O module functions, as the purpose of the secondary I/O modules is to simply connect primary I/O modules to additional server devices that are not located in its primary I/O module rack chassis.

In the illustrated embodiment, the automated multi-fabric link aggregation system 200 also includes a fabric 210 having a plurality of leaf switch devices 212a and 212b. In an embodiment, either or both of the leaf switch devices 212a and 212b may be provided by the IHS 100 discussed above with reference to FIG. 1, and/or may include some or all of the components of the IHS 100, and in specific examples may be provided by Top Of Rack (TOR) switch devices. However, while illustrated and discussed as being provided by TOR switch devices, one of skill in the art in possession of the present disclosure will recognize that the port configuration migration system 200 may include any devices that may be configured to operate similarly as the leaf switch devices 212a and 212b discussed below. In the illustrated embodiment, pairs of leaf switch devices (e.g., the leaf switch devices 212a/212b) may be coupled together by inter-switch links that may be provided by aggregated Inter-Chassis Links (ICLs) (also referred to as VLT interconnects (VLTi's) in the VLT protocol), and/or other inter-switch connections that would be apparent to one of skill in the art in possession of the present disclosure. As discussed in further detail below, the leaf switch device 212a may be coupled to each of the primary I/O modules 204a and 204b, and the leaf switch device 212b may be coupled to each of the primary I/O modules 204a and 204b.

In the illustrated embodiment, the fabric 210 also includes a pair of spine switch devices 214a and 212b, with the spine switch device 214a coupled to each of the leaf switch devices 212a and 212b, and the spine switch device 214b coupled to each of the leaf switch devices 212a and 216b as well. As will be appreciated by one of skill in the art in possession of the present disclosure, any connection between either of the spine switch devices 214a/214b and a leaf switch device 212a/212b may include one or more links that may be aggregated similarly as discussed above. In an embodiment, either or both of the spine switch devices 214a and 214b may be provided by the IHS 100 discussed above with reference to FIG. 1, and/or may include some or all of the components of the IHS 100. However, while illustrated and discussed as being provided by spine switch devices, one of skill in the art in possession of the present disclosure will recognize that the automated multi-fabric link aggregation system 200 may include any devices that may be configured to operate similarly as the spine switch devices 214a and 214b discussed below.

In the illustrated embodiment, the fabric 210 also includes an Internet device 216 that is connected to the leaf switch device 212b, as well as to the Internet (not explicitly illustrated in FIG. 2). In an embodiment, the Internet device 216 may be provided by the IHS 100 discussed above with reference to FIG. 1, and/or may include some or all of the components of the IHS 100, and in specific examples may be provided by a router device. However, while illustrated and discussed as being provided by a router device, one of skill in the art in possession of the present disclosure will recognize that the automated multi-fabric link aggregation system 200 may include any devices that may be configured to operate similarly as the Internet device 216 discussed below. However, while a specific automated multi-fabric link aggregation system 200 has been illustrated and described, one of skill in the art in possession of the present disclosure will recognize that the port configuration migration system of the present disclosure may include a variety of components and component configurations while remaining within the scope of the present disclosure as well.

Figure 3:
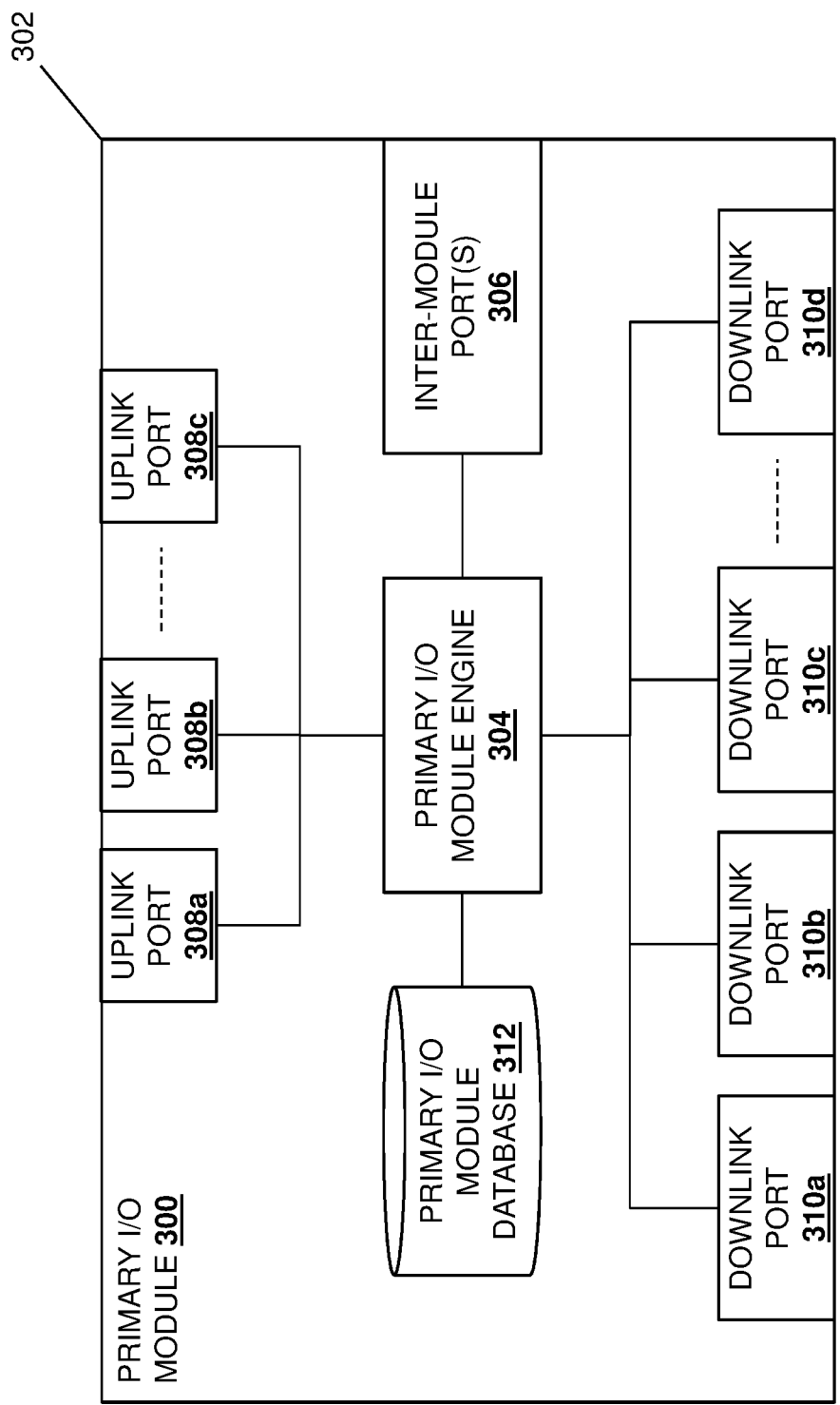
FIG. 3 is a schematic view illustrating an embodiment of a primary I/O module included in the automated multi-fabric link aggregation system of FIG. 2.

Referring now to FIG. 3, an embodiment of a primary I/O module 300 is illustrated that may provide either or both of the primary I/O modules 204a and 204b discussed above with reference to FIG. 2. As such, the primary I/O module 300 may be provided by the IHS 100 discussed above with reference to FIG. 1 and/or may include some or all of the components of the IHS 100, and in specific examples may be provided by a DELL® EMC® networking MX9116n fabric switching engine switch device, available from DELL® Inc. of Round Rock, Tex., United States. Furthermore, while illustrated and discussed as a particular primary I/O module, one of skill in the art in possession of the present disclosure will recognize that the functionality of the primary I/O module 300 discussed below may be provided by other devices that are configured to operate similarly as the primary I/O module 300 discussed below. In the illustrated embodiment, the primary I/O module 300 includes a chassis 302 that houses the components of the primary I/O module 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a primary I/O module engine 304 that is configured to perform the functionality of the primary I/O module engines and/or primary I/O modules discussed below. As discussed below, in some examples the functionality of the primary I/O module engine 304 may include primary I/O module functionality as well as the fabric manager functionality of a fabric manager system such as, for example, an SFS fabric manager system available in operating systems provided by DELL® Inc. of Round Rock, Tex., United States.

The chassis 302 may also include inter-module port(s) 306 that is configured to couple the primary I/O module engine 304 to other primary I/O modules, as discussed in further detail below. In addition, the chassis 302 may include a plurality of uplink ports 308a, 308b, and up to 308c that, as discussed below, may couple the primary I/O module to any of the leaf switch devices 212a and 212b. Furthermore, the chassis 302 may also include a plurality of downlink ports 310a, 310b, 310c, and up to 310d that, as discussed below, may couple the primary I/O module 300 to any of the secondary I/O modules 206a-206b and/or server devices 208a or 208b.

The chassis 302 may also house a storage device (not illustrated, but which may include the storage device 108 discussed above with reference to FIG. 1) that is coupled to the primary I/O module engine 304 (e.g., via a coupling between the storage device and the processing system) and that may include a primary I/O module database 312 that is configured to store any of the information utilized by the primary I/O module engine 304 discussed below. However, while a specific primary I/O module 300 has been illustrated, one of skill in the art in possession of the present disclosure will recognize that primary I/O modules (or other devices operating according to the teachings of the present disclosure in a manner similar to that described below for the primary I/O module 300) may include a variety of components and/or component configurations for providing conventional primary I/O module functionality, as well as the functionality discussed below, while remaining within the scope of the present disclosure as well.

Figure 4:
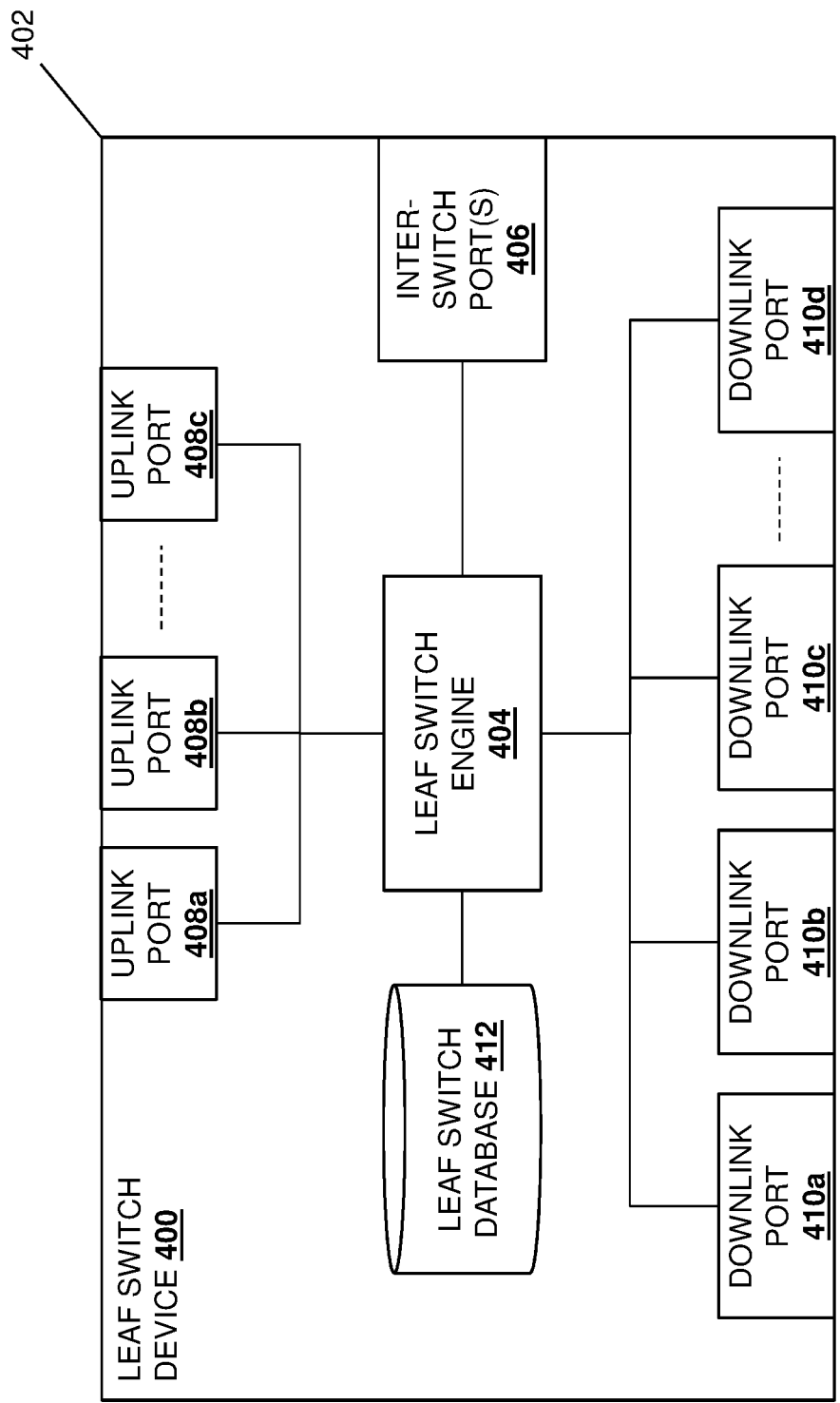
FIG. 4 is a schematic view illustrating an embodiment of a leaf switch device included in the automated multi-fabric link aggregation system of FIG. 2.

Referring now to FIG. 4, an embodiment of a leaf switch device 400 is illustrated that may provide either or both of the leaf switch devices 212a and 212b discussed above with reference to FIG. 2. As such, the leaf switch device 400 may be provided by the IHS 100 discussed above with reference to FIG. 1 and/or may include some or all of the components of the IHS 100, and in specific examples may be provided by TOR switch device However, while illustrated and discussed as a TOR switch device, one of skill in the art in possession of the present disclosure will recognize that the functionality of the leaf switch device 400 discussed below may be provided by other devices that are configured to operate similarly as the leaf switch device 400 discussed below. In the illustrated embodiment, the leaf switch device 400 includes a chassis 402 that houses the components of the leaf switch device 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a leaf switch engine 404 that is configured to perform the functionality of the leaf switch engines and/or leaf switch devices discussed below. As discussed below, in some examples the functionality of the leaf switch engine 404 may include leaf switch functionality as well as the fabric manager functionality of a fabric manager system such as, for example, an SFS fabric manager system available in operating systems provided by DELL® Inc. of Round Rock, Tex., United States.

The chassis 402 may also include inter-switch port(s) 406 that is configured to couple the leaf switch engine 404 to other leaf switch devices, as discussed in further detail below. In addition, the chassis 402 may include a plurality of uplink ports 408a, 408b, and up to 408c that, as discussed below, may couple the leaf switch device 400 to any of the spine switch devices 214a and 214b. Furthermore, the chassis 402 may also include a plurality of downlink ports 410a, 410b, 410c, and up to 410d that, as discussed below, may couple the leaf switch device 400 to any of the primary I/O modules 204a and 204b.

The chassis 402 may also house a storage device (not illustrated, but which may include the storage device 108 discussed above with reference to FIG. 1) that is coupled to the leaf switch engine 404 (e.g., via a coupling between the storage device and the processing system) and that may include a leaf switch database 412 that is configured to store any of the information utilized by the leaf switch engine 404 discussed below. However, while a specific leaf switch device 400 has been illustrated, one of skill in the art in possession of the present disclosure will recognize that leaf switch device (or other devices operating according to the teachings of the present disclosure in a manner similar to that described below for the leaf switch device 400) may include a variety of components and/or component configurations for providing conventional leaf switch functionality, as well as the functionality discussed below, while remaining within the scope of the present disclosure as well.

Figure 5:
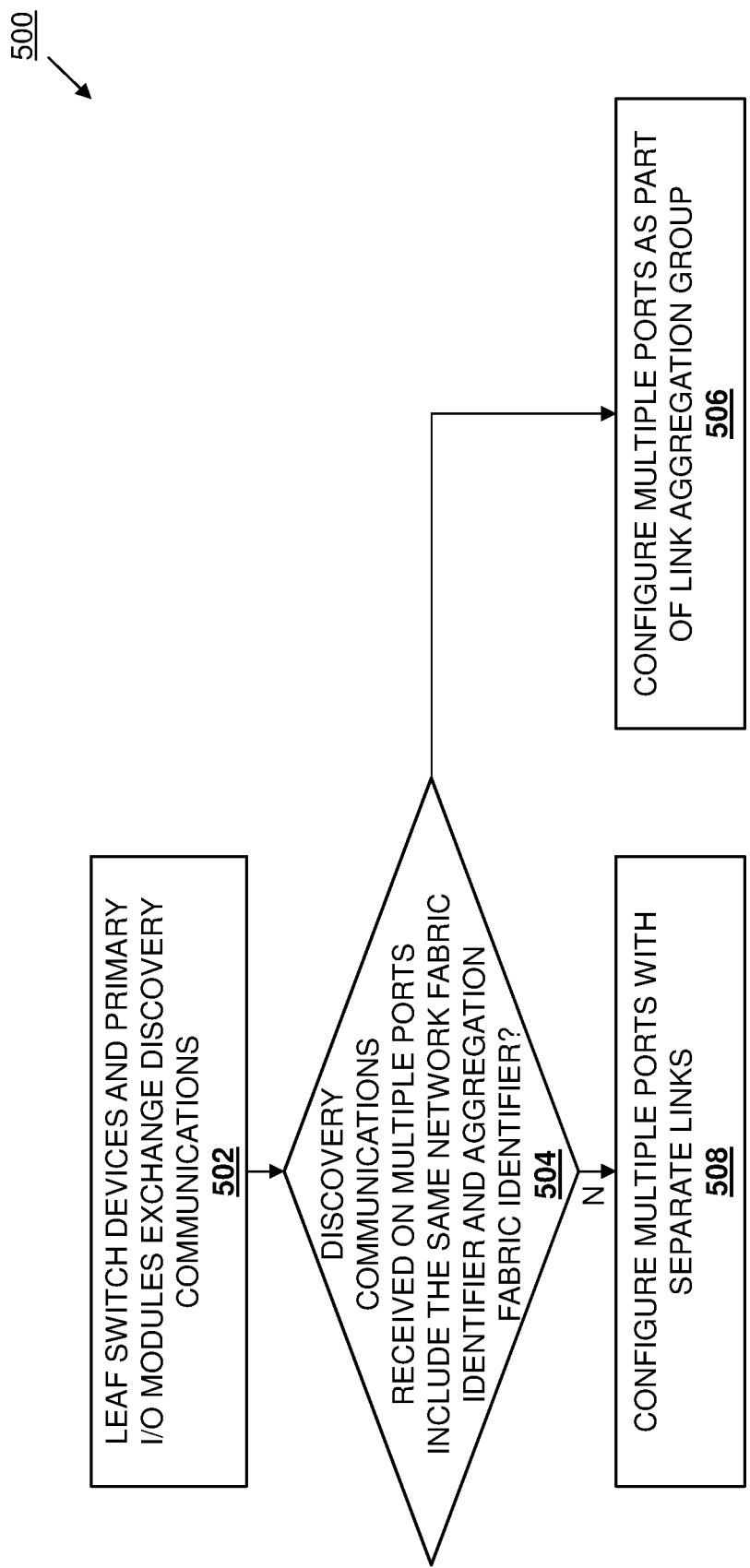
FIG. 5 is a flow chart illustrating an embodiment of a method for automatically configuring link aggregations in different network fabrics.

Referring now to FIG. 5, an embodiment of a method 500 for automatically configuring link aggregations in multiple fabrics is illustrated. As discussed below, the systems and methods of the present disclosure provide first aggregated devices in a first network fabric that detect that their ports are connected to second aggregated devices in a second network fabric and, in response, operate to automatically configure those ports as part of a LAG. For example, leaf switch devices having leaf switch device downlink ports are included in a first network fabric and have been aggregated to provide a first aggregation fabric, and each of those leaf switch devices operate to generate first discovery communications that include a first network fabric identifier that identifies the first network fabric, and a first aggregation fabric identifier that identifies the first aggregation fabric. Those leaf switch devices then transmit the first discovery communications via each of the leaf switch device downlink ports to I/O modules via their I/O module uplink ports, with those I/O modules included in a second network fabric and aggregated to provide a second aggregation fabric. The I/O modules receive the first discovery communications from the leaf switch devices via each of the I/O module uplink ports, determine that each first discovery communication received via each of the I/O module uplink ports includes the first network fabric identifier and the first aggregation fabric identifier and, in response, automatically configure the I/O module uplink ports in a first LAG. As such, first aggregated devices in a first network fabric that are connected to second aggregated devices in a second network fabric may operate to automatically configure their ports in a LAG without having to wait for the second aggregated devices in the second network fabric to configure their ports in a LAG, thus saving time, reducing errors, and providing for automated configuration of the connection between the first network fabric and the second network fabric.

Figure 6:
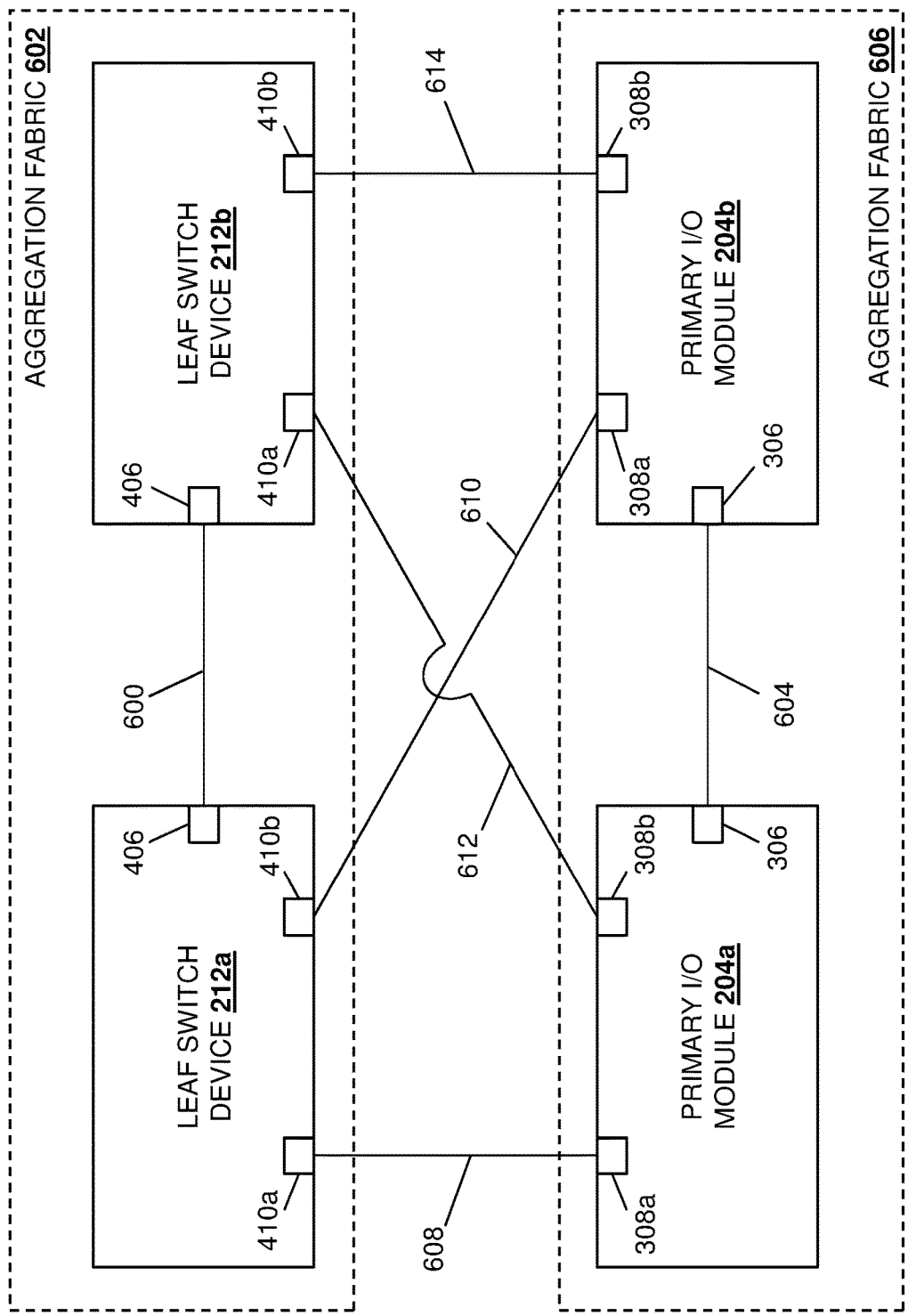
FIG. 6 is a schematic view illustrating an embodiment of the automated multi-fabric link aggregation system of FIG. 2 in a first configuration.

With reference to FIG. 6, an example of specific connections of the primary I/O modules 204a and 204b and the leaf switch devices 212a and 212b of FIG. 2 is illustrated for purposes of the discussion provided below. As will be appreciated by one of skill in the art in possession of the present disclosure, a network administrator or other user may physically connect and configure the fabrics 202 and 210 in the manner described below, thus connecting the primary I/O modules 204a/204b and leaf switch devices 212a/212b and configuring them with information that may be utilized to aggregate them as discussed below. In the illustrated embodiment, the leaf switch devices 212a and 212b are coupled together via their inter-switch port(s) 406 by a link 600 (e.g., provided by one or more cables between the inter-switch ports 406), and one of skill in the art in possession of the present disclosure will appreciate that the leaf switch engines 404 in the leaf switch devices 212a/400 and 212b/400 may be configured, based on the user configuration discussed above and in response to the detecting the link 600, to configure themselves in as part of an aggregation fabric 602. For example, the leaf switch devices 212a/400 and 212b/400 may utilize the VLT protocol, and in response to detecting a VLT interconnect (VLTi) provided by the link 600, their leaf switch engines 404 may operate to configure a VLT domain that provides the aggregation fabric 602. As will be appreciated by one of skill in the art in possession of the present disclosure, a network administrator or other user may provide a variety of configuration information in the leaf switch databases 412 of the leaf switch devices 212a/400 and 212b/400 that will cause them to configure themselves as part of the aggregation fabric 602. However, while a specific technique for configuring leaf switch devices in an aggregation fabric has been described, one of skill in the art in possession of the present disclosure will appreciate that leaf switch devices may be configured as part of an aggregation fabric in a variety of manners that will fall within the scope of the present disclosure as well.

Similarly, the primary I/O modules 204a/300 and 204b/300 are coupled together via their inter-module port(s) 306 by a link 604 (e.g., provided by one or more cables between the inter-module ports 306), and one of skill in the art in possession of the present disclosure will appreciate that the primary I/O module engines 304 in the primary I/O modules 204a/300 and 204b/300 may be configured, based on the user configuration discussed above and in response to the detecting the link 604, to configure themselves as part of an aggregation fabric 606. For example, the primary I/O modules 204a/300 and 204b/300 may utilize the VLT protocol, and in response to detecting a VLT interconnect (VLTi) provided by the link 604, their primary I/O module engines 304 may operate to configure a VLT domain that provides the aggregation fabric 606. Similarly as discussed above, a network administrator or other user may provide a variety of configuration information in the primary I/O module databases 312 of the primary I/O modules 204a/300 and 204b/300 that causes them to configure themselves as part of the aggregation fabric 606. However, while a specific technique for configuring primary I/O modules in an aggregation fabric has been described, one of skill in the art in possession of the present disclosure will appreciate that primary I/O modules may be configured as part of an aggregation fabric in a variety of manners that will fall within the scope of the present disclosure as well.

As illustrated, the leaf switch device 212a/400 may be coupled to each of the primary I/O modules 204a/300 and 204b/300 via a link 608 between its downlink port 410a and the uplink port 308a on the primary I/O module 204a/300, and a link 610 between its downlink port 410b and the uplink port 308a on the primary I/O module 204b/300. Similarly, the leaf switch device 212b/400 may be coupled to each of the primary I/O modules 204a/300 and 204b/300 via a link 612 between its downlink port 410a and the uplink port 308b on the primary I/O module 204a/300, and a link 614 between its downlink port 410b and the uplink port 308b on the primary I/O module 204b/300.

In some embodiments, the leaf switch engines 404 in the leaf switch devices 212a/400 and 212b/400 may operate to elect one of those leaf switch engines 404 to operate as a fabric manager engine/fabric manager system (e.g., an SFS fabric manager engine/fabric manager system) that operates to manage the network fabric 210. Similarly, the primary I/O module engines 304 in the primary I/O modules 204a/300 and 204b/300 may operate to elect one of those primary I/O module engines 304 to operate as a fabric manager engine/fabric manager system (e.g., an SFS fabric manager engine/fabric manager system) that operates to manage the network fabric 202. As such, each of the fabrics 202 and 210 may be provided in a "smart fabric" mode that is managed by its respective fabric manager engine/fabric manager system. However, one of skill in the art in possession of the present disclosure will also recognize that other leaf switch devices (not illustrated) in the fabric 210 may configure their leaf switch engine to operate as the fabric manager engine/fabric manager system that manages the fabric 210, and other primary I/O modules (not illustrated) in the fabric 202 may configure their primary I/O module engine to operate as the fabric manager engine/fabric manager system that manages the fabric 202, while remaining within the scope of the present disclosure as well.

As discussed above, in a smart fabric mode, the downlink ports 410a and 410b on the leaf switch devices 212a/400 and 212b/400 and the uplink ports 308a and 308b on the primary I/O modules 204a/300 and 204b/300 may be configured in a passive mode (e.g., a passive LACP mode). As such, the leaf switch engine 404 in the leaf switch devices 212a/400 or 212b/400 that operates as the fabric manager engine/fabric manager system will wait to detect the configuration of the uplink ports 308a and 308b on the primary I/O modules 204a/300 and 204b/300 in a LAG (or VLT port channel in the VLT protocol) prior to configuring the downlink ports 410a and 410b on the leaf switch devices 212a/400 and 212b/400 in a LAG (or VLT port channel in the VLT protocol). Similarly, the primary I/O module engine 304 in the primary I/O modules 204a/300 and 204b/300 that operates as the fabric manager engine/fabric manager system will wait to detect the configuration of the downlink ports 410a and 410b on the leaf switch devices 212a/400 and 212b/400 in a LAG (or VLT port channel in the VLT protocol) prior to configuring the uplink ports 308a and 308b on the primary I/O modules 204a/300 and 204b/300 in a LAG (or VLT port channel in the VLT protocol). As such, following the connection of the leaf switch devices 212a and 212b and the primary I/O modules 204a and 204b via the links 608, 610, 612, and 614 in a conventional system, a network administrator or other user must manually configure the ports on at least one of the pair of leaf switch devices 212a and 212b or the pair of primary I/O modules 204a and 204b as part of LAG in order to cause the connection between the leaf switch devices 212a and 212b and the primary I/O modules 204a and 204b (and thus the connection between the network fabrics 202 and 210) to be configured. As discussed below, the method 500 eliminates the need for such manual configuration by having one of the pair of leaf switch devices 212a and 212b or the pair of primary I/O modules 204a and 204b automatically configure its ports as part of a LAG without having to detect the ports opposite the links to its ports as having been configured as part of a LAG.

The method 500 begins at block 502 where the leaf switch devices and the primary I/O modules exchange discovery communications. In an embodiment, at block 502, the leaf switch engines 404 in each of the leaf switch devices 212a/400 and 212b/400 may generate discovery communications that include a network fabric identifier for the network fabric 210, and an aggregation fabric identifier for the aggregation fabric 602, and may operate at block 502 to transmit those discovery communications via their downlink ports 410a and 410b to the primary I/O modules 204a and 204b. Similarly, at block 502, the primary I/O module engines 304 in each of the primary I/O modules 204a/300 and 204b/300 may generate discovery communications that include a network fabric identifier for the network fabric 202, and an aggregation fabric identifier for the aggregation fabric 606, and may operate at block 502 to transmit those discovery communications via their uplink ports 308a and 308b to the leaf switch devices 212a and 212b. In an embodiment, the discovery communications exchanged at block 502 may include Link Layer Discovery Protocol (LLDP) communications with "custom" Type-Length-Value (TLV) data structures that are configured to store the network fabric identifiers and aggregation fabric identifiers discussed above. However, one of skill in the art in possession of the present disclosure will appreciate that the discovery communications of the present disclosure may be provided using other techniques while remaining within the scope of the present disclosure as well.

Figure 7:
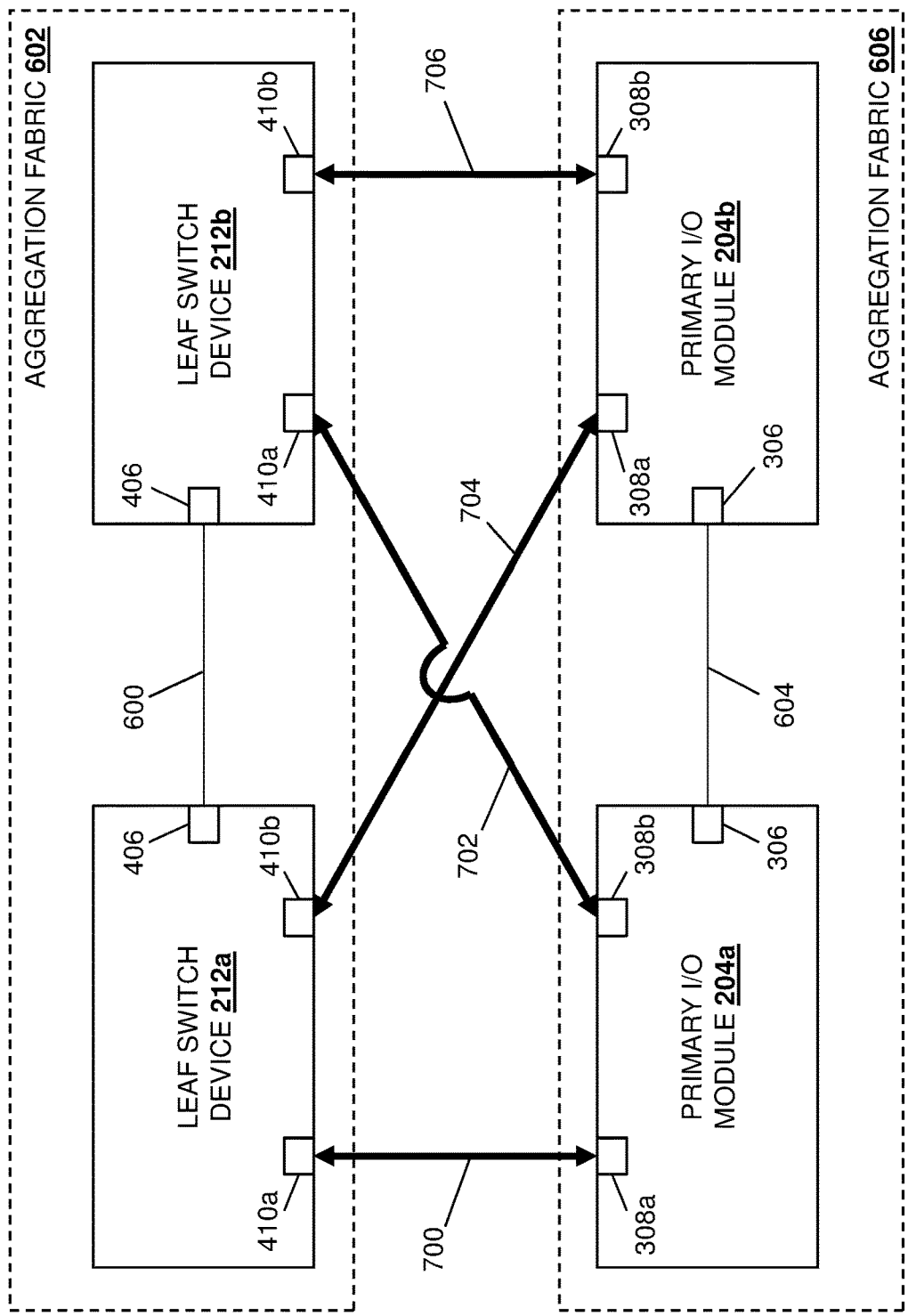
FIG. 7 is a schematic view illustrating an embodiment of the automated multi-fabric link aggregation system of FIG. 6 operating during the method of FIG. 5.

For example, FIG. 7 illustrates how the primary I/O module 204a and the leaf switch device 212a may exchange discovery communications 700 via the link 608, the primary I/O module 204a and the leaf switch device 212b may exchange discovery communications 702 via the link 612, how the primary I/O module 204b and the leaf switch device 212a may exchange discovery communications 704 via the link 610, and the primary I/O module 204b and the leaf switch device 212b may exchange discovery communications 706 via the link 614. However, while the primary I/O modules 204a and 204b and the leaf switch devices 212a and 212b are illustrated and described as exchanging discovery communications that identify their respective network fabrics and aggregation fabrics, in some embodiments only one of the pair of the primary I/O modules 204a and 204b or the leaf switch devices 212a and 212b may generate and transmit discovery communications that identify their network fabric and aggregation fabric while remaining within the scope of the present disclosure as well.

The method 500 then proceeds to decision block 504 where it is determined whether discovery communications are received on multiple ports that include the same network fabric identifier and aggregation fabric identifier. In some embodiments, at decision block 504, the primary I/O module engine 304 in the primary I/O module 204a/300 and/or 204b/300 may operate to determine whether the discovery communications received from the leaf switch devices 212a and 212b via the uplink ports 308a and 308b on the primary I/O modules 204a/300 and/or 204b/300 include the same network fabric identifier and aggregation fabric identifier. For example, the primary I/O module engine 304 in the primary I/O modules 204a/300 and/or 204b/300 may receive the LLDP communications generated and transmitted by the leaf switch devices 212a and 212b at block 502 via the uplink ports 308a and 308b, identify the network fabric identifiers and aggregation fabric identifiers in the TLV data structures, and determine whether those network fabric identifiers and aggregation fabric identifiers are the same.

Similarly, in some embodiments of decision block 504, the leaf switch engine 404 in the leaf switch device 212a/400 and/or 212b/400 may operate to determine whether the discovery communications received from the primary I/O modules 204a and 204b via the downlink ports 410a and 410b on the leaf switch devices 212a/400 and 212b/400 include the same network fabric identifier and aggregation fabric identifier. For example, the leaf switch engine 404 in the leaf switch device 212a/400 and/or 212b/400 may receive the LLDP communications generated and transmitted by the primary I/O modules 204a and 204b at block 502 via the downlink ports 410a and 410b, identify the network fabric identifiers and aggregation fabric identifiers in the TLV data structures, and determine whether those network fabric identifiers and aggregation fabric identifiers are the same.

As will be appreciated by one of skill in the art in possession of the present disclosure, the identification of the same network fabric identifier and aggregation fabric identifier in discovery communications received from second devices via different ports on first devices that are part of a first network fabric/SFS domain and configured in a first aggregation fabric indicates to those first devices that the second devices are included in a common second fabric/SFS domain and are configured as part of a common second aggregation fabric. As such, the first devices may recognize that they are part of the first aggregation fabric that is connected to the second aggregation fabric and that the links between those aggregation fabrics should be aggregated, but that the second devices in the second network fabric/SFS domain are waiting for the ports on the first devices in the first network fabric/SFS domain to be aggregated before aggregating their own ports (i.e., the ports on the second devices). Thus, the first devices may operate to aggregate their ports in response to identifying the same network fabric identifier and aggregation fabric identifier in the discovery communications received from second devices via their ports, which allows the configuration of the aggregation connection between the first network fabric/SFS domain and the second network fabric/SFS domain to be completed automatically simply in response to connected the first devices and the second devices. As discussed in further detail below, this automated aggregation technique may be performed by the first and second devices in both of the first and second network fabrics/SFS domains, or may be performed by the devices in one of the network fabrics/SFS domains while being followed by the use of link aggregation communications that cause the aggregation of the ports on the devices in the other network fabric/SFS domain.

Figure 8A:
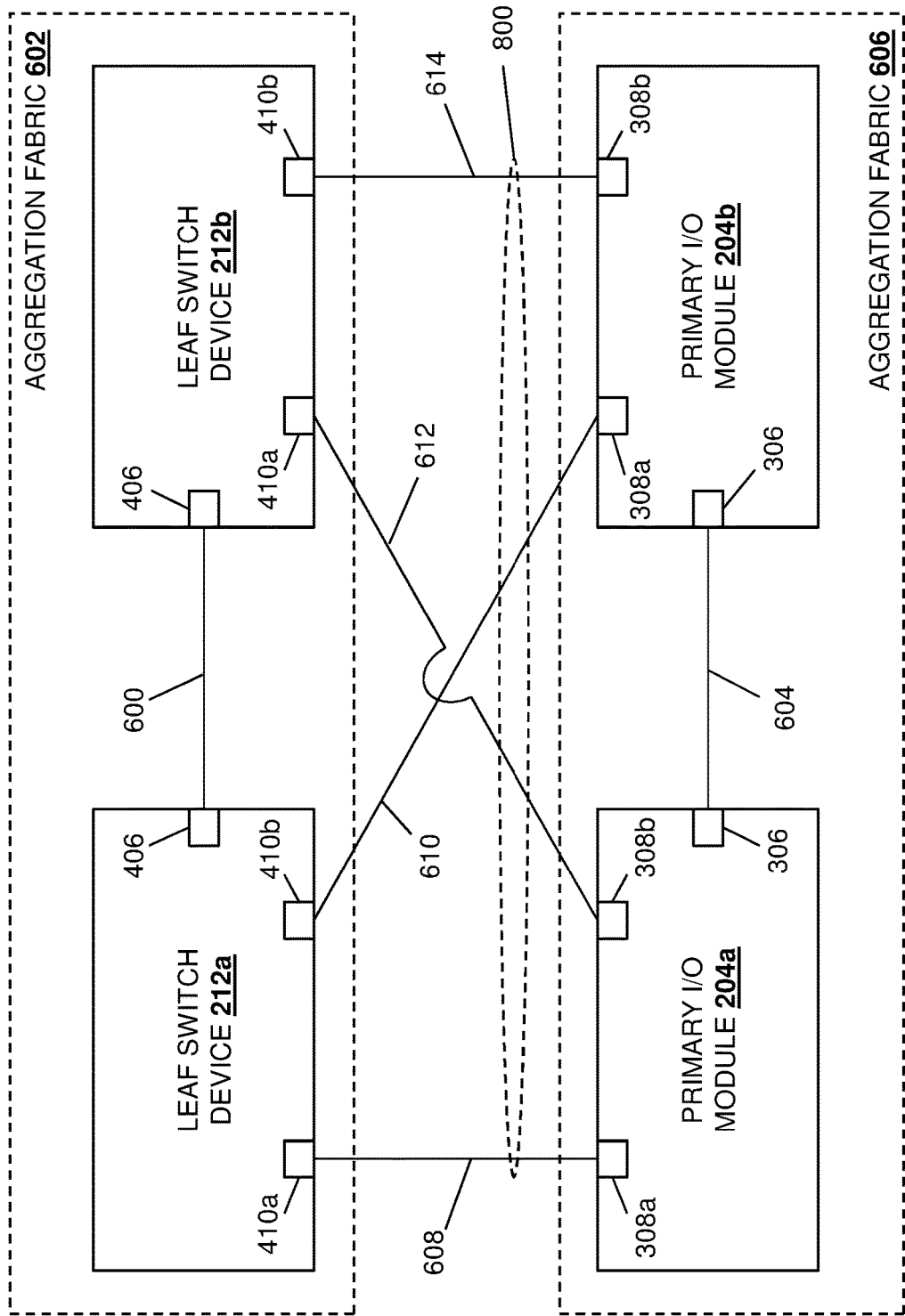
FIG. 8A is a schematic view illustrating an embodiment of the automated multi-fabric link aggregation system of FIG. 6 operating during the method of FIG. 5.
Figure 8B:
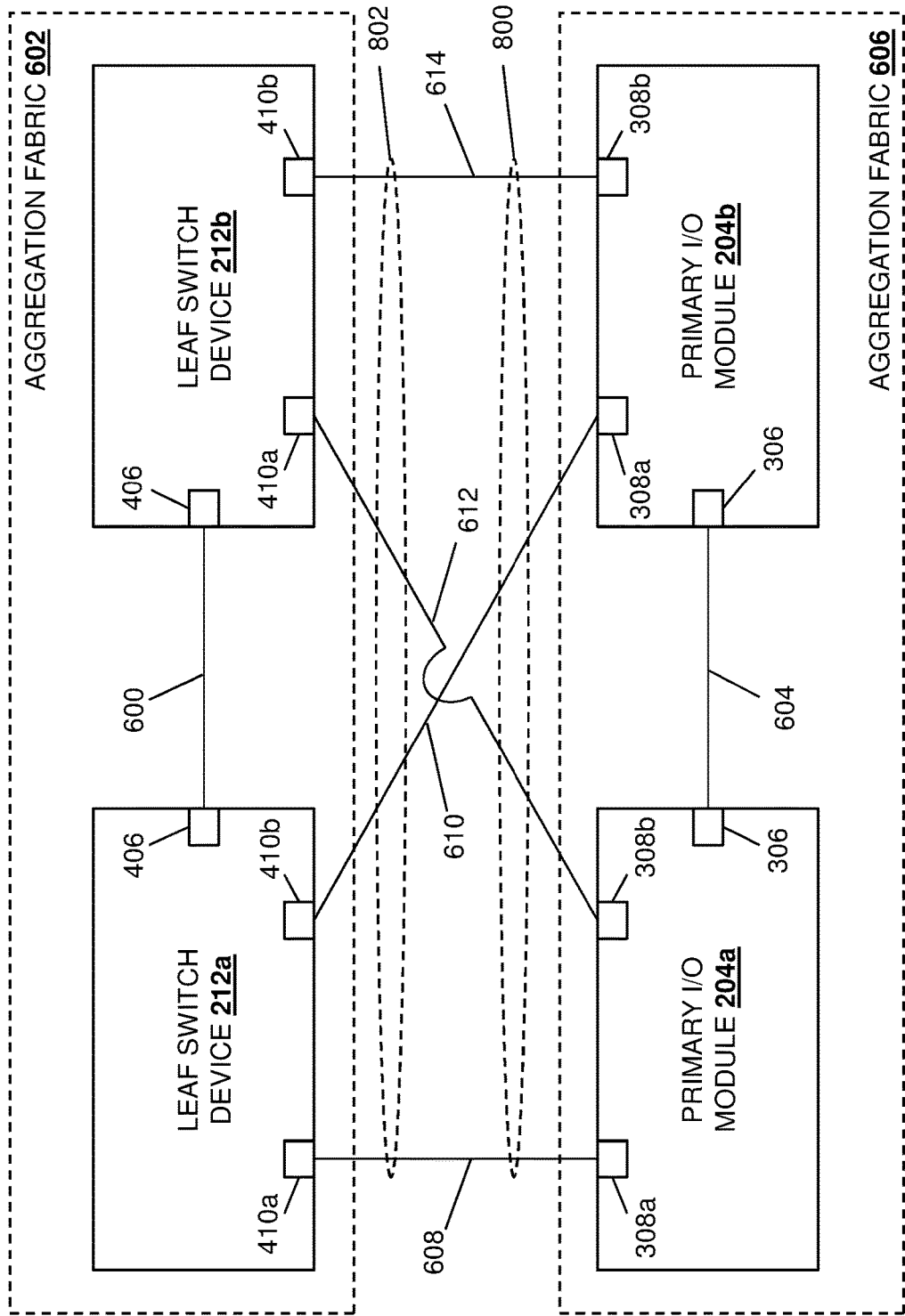
FIG. 8B is a schematic view illustrating an embodiment of the automated multi-fabric link aggregation system of FIG. 6 operating during the method of FIG. 5.

In a first example illustrated in FIGS. 8A and 8B, the ports on each of the primary I/O modules 204a and 204b and each of the leaf switch devices 212a and 212b are configured based on the discovery communications exchanged at block 502. As such, in some embodiments of decision block 504, the primary I/O module engine 304 in the primary I/O module 204a/300 and/or 204b/300 may determine that the discovery communications received via each of the uplink ports 308a and 308b on the primary I/O modules 204a/300 and 204b/300 include the network fabric identifier for the network fabric 210 and the aggregation fabric identifier for the aggregation fabric 602, and the method 500 proceeds to block 506 where the primary I/O module engine 304 in the primary I/O module 204a/300 and/or 204b/300 configures the uplink ports 308a and 308b on the primary I/O modules 204a/300 and 204/300 as part of a link aggregation group. In an embodiment, in response to determining that the discovery communications received via each of the uplink ports 308a and 308b on the primary I/O modules 204a/300 and 204b/300 include the network fabric identifier for the network fabric 210 and the aggregation fabric identifier for the aggregation fabric 602, the primary I/O module engine 304 in the primary I/O module 204a/300 and/or 204b/300 may reconfigure the uplink ports 308a and 308b on the primary I/O modules 204a/300 and 204b/300 from a passive mode (e.g., an LACP passive mode) to an active mode (e.g., an LACP active mode), which one of skill in the art in possession of the present disclosure will appreciate may allow for the automatic link aggregation operations discussed below.

For example, FIG. 8A illustrates how the primary I/O module engine 304 in the primary I/O module 204a/300 and/or 204b/300 may operate at block 506 to configure the uplink ports 308a and 308b on the primary I/O modules 204a/300 and 204/300 to provide a Link Aggregation Group (LAG) 800 (e.g., a VLT port channel in the VLT protocol). Some of the inventors of the present disclosure describe techniques for automatically configuring ports to provide a LAG in U.S. patent application Ser. No. 16/263,431, attorney docket no. 16356.1986US01, filed on Jan. 31, 2019, the disclosure of which is incorporated by reference herein in its entirety. However, while that patent application describes specific techniques for configuring ports in a LAG, one of skill in the art in possession of the present disclosure will appreciate that the uplink ports 308a and 308b on the primary I/O modules 204a/300 and 204b/300 may be configured to provide the LAG 800 in a variety of manners that will fall within the scope of the present disclosure as well.

Similarly, in this embodiment of decision block 504, the leaf switch engine 404 in the leaf switch device 212a/400 and/or 212b/400 may determine that the discovery communications received via each of the downlink ports 410a and 410b on the leaf switch devices 212a/400 and 212b/400 include the network fabric identifier for the network fabric 202 and the aggregation fabric identifier for the aggregation fabric 606, and the method 500 proceeds to block 506 where the leaf switch engine 404 in the leaf switch device 212a/400 and/or 212b/400 configures the downlink ports 410a and 410b on the leaf switch devices 212a/400 and 212b/400 as part of a link aggregation group. In an embodiment, in response to determining that the discovery communications received via each of the downlink ports 410a and 410b on the leaf switch devices 212a/400 and 212b/400 include the network fabric identifier for the network fabric 202 and the aggregation fabric identifier for the aggregation fabric 606, the leaf switch engine 404 in the leaf switch device 212a/400 and/or 212b/400 may reconfigure the downlink ports 410a and 410b on the leaf switch device 212a/400 and 212b/400 from a passive mode (e.g., an LACP passive mode) to an active mode (e.g., an LACP active mode), which one of skill in the art in possession of the present disclosure will appreciate may allow for the automatic link aggregation operations discussed below.

For example, FIG. 8B illustrates how the leaf switch device 212a/400 and/or 212b/400 may operate at block 506 to configure the downlink ports 410a and 410b on the leaf switch device 212a/400 and/or 212b/400 to provide a Link Aggregation Group (LAG) 802 (e.g., a VLT port channel in the VLT protocol). As discussed above, some of the inventors of the present disclosure describe techniques for automatically configuring ports to provide a LAG in U.S. patent application Ser. No. 16/263,431, attorney docket no. 16356.1986US01, filed on Jan. 31, 2019, the disclosure of which is incorporated by reference herein in its entirety. However, while that patent application describes specific techniques for configuring ports in a LAG, one of skill in the art in possession of the present disclosure will appreciate that the downlink ports 410a and 410b on the primary I/O modules 212a/400 and 212b/400 may be configured to provide the LAG 802 in a variety of manners that will fall within the scope of the present disclosure as well. Furthermore, one of skill in the art in possession of the present disclosure will appreciate that while the LAG 800 is described as being configured prior to the LAG 802, the LAG 802 may be configured prior to the LAG 800, or the LAGs 800 and 802 may be configured at substantially the same time, while remaining within the scope of the present disclosure as well. As such, following block 506, the connection between the network fabrics 202 and 210 provided by the primary I/O modules 204a and 204b and the leaf switch devices 212a and 212b is configured to allow the primary I/O modules 204a and 204b and the leaf switch devices 212a and 212b to exchange communications (e.g., that are generated by and/or directed to the server devices 208a-208d).

Figure 9A:
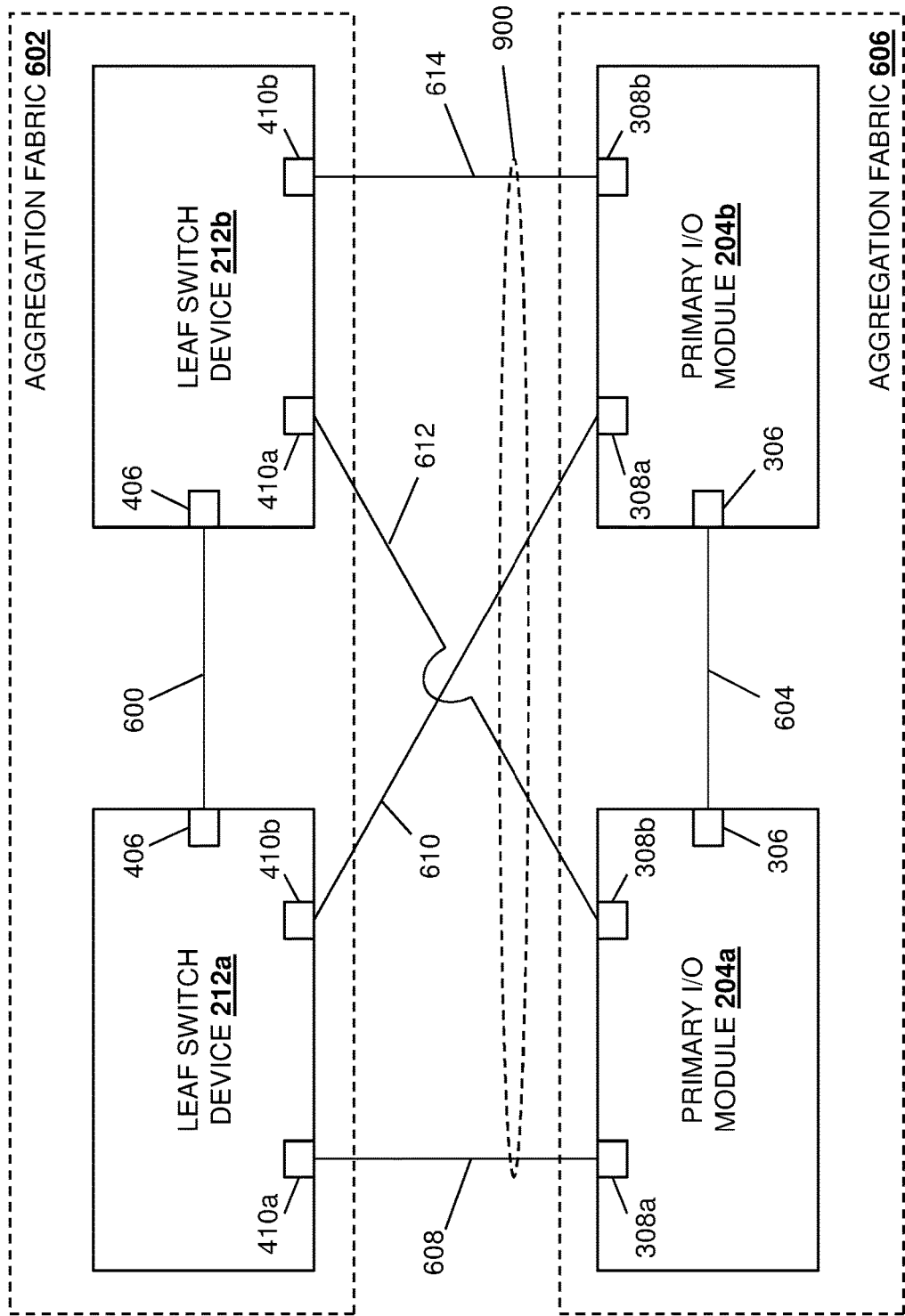
FIG. 9A is a schematic view illustrating an embodiment of the automated multi-fabric link aggregation system of FIG. 6 operating during the method of FIG. 5.
Figure 9B:
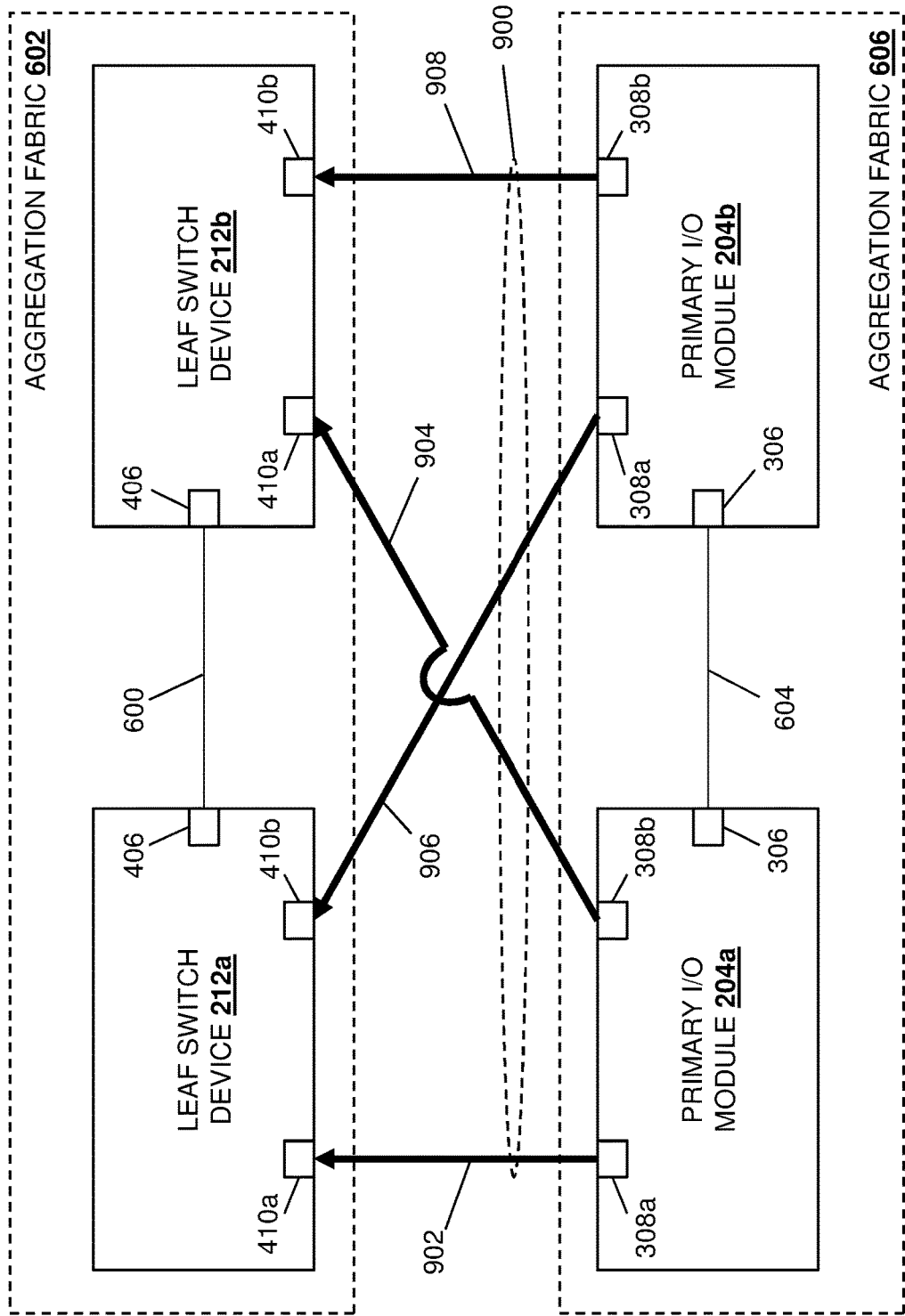
FIG. 9B is a schematic view illustrating an embodiment of the automated multi-fabric link aggregation system of FIG. 6 operating during the method of FIG. 5.
Figure 9C:
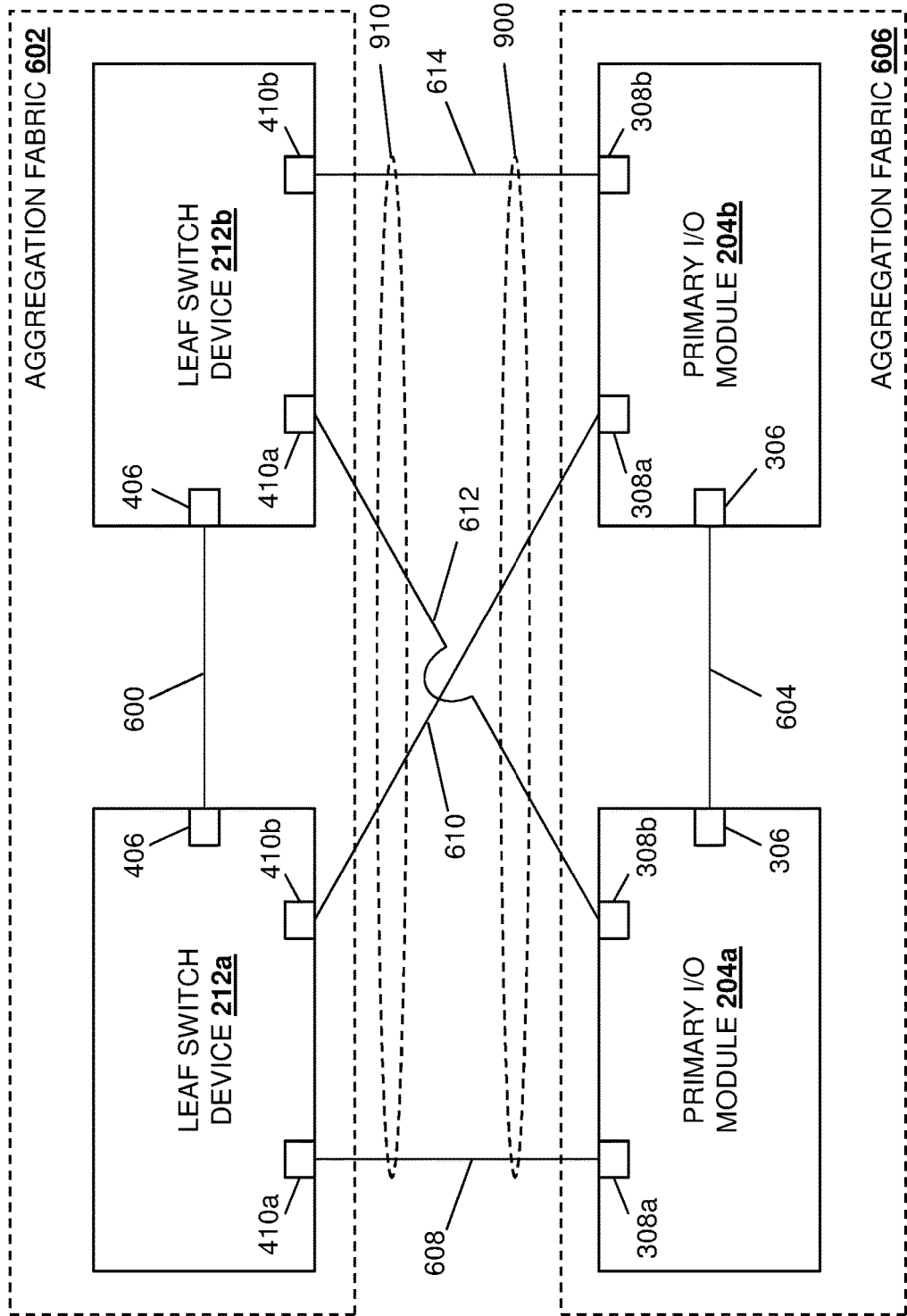
FIG. 9C is a schematic view illustrating an embodiment of the automated multi-fabric link aggregation system of FIG. 6 operating during the method of FIG. 5.

In another example illustrated in FIGS. 9A, 9B, and 9C, the ports on each of the primary I/O modules 204a and 204b are configured based on the discovery communications exchanged at block 502, and subsequent link aggregation communications are utilized to configure the ports on each of the leaf switch devices 212a and 212b. As such, in some embodiments of decision block 504, the primary I/O module engine 304 in the primary I/O module 204a/300 and/or 204b/300 may determine that the discovery communications received via each of the uplink ports 308a and 308b on the primary I/O modules 204a/300 and 204b/300 include the network fabric identifier for the network fabric 210 and the aggregation fabric identifier for the aggregation fabric 602, and the method 500 proceeds to block 506 where the primary I/O module engine 304 in the primary I/O module 204a/300 and/or 204b/300 configures the uplink ports 308a and 308b on the primary I/O modules 204a/300 and 204/300 as part of a link aggregation group. In an embodiment, in response to determining that the discovery communications received via each of the uplink ports 308a and 308b on the primary I/O modules 204a/300 and 204b/300 include the network fabric identifier for the network fabric 210 and the aggregation fabric identifier for the aggregation fabric 602, the primary I/O module engine 304 in the primary I/O module 204a/300 and/or 204b/300 may reconfigure the uplink ports 308a and 308b on the primary I/O modules 204a/300 and 204b/300 from a passive mode (e.g., an LACP passive mode) to an active mode (e.g., an LACP active mode), which one of skill in the art in possession of the present disclosure will appreciate may allow for the automatic link aggregation operations discussed below.

For example, FIG. 9A illustrates how the primary I/O module engine 304 in the primary I/O module 204a/300 and/or 204b/300 may operate at block 506 to configure the uplink ports 308a and 308b on the primary I/O modules 204a/300 and 204/300 to provide a Link Aggregation Group (LAG) 900 (e.g., a VLT port channel in the VLT protocol). As discussed above, some of the inventors of the present disclosure describe techniques for automatically configuring ports to provide a LAG in U.S. patent application Ser. No. 16/263,431, attorney docket no. 16356.1986US01, filed on Jan. 31, 2019, the disclosure of which is incorporated by reference herein in its entirety. However, while that patent application describes specific techniques for configuring ports in a LAG, one of skill in the art in possession of the present disclosure will appreciate that the uplink ports 308a and 308b on the primary I/O modules 204a/300 and 204b/300 may be configured to provide the LAG 900 in a variety of manners that will fall within the scope of the present disclosure as well.

In this embodiment, following the configuration of the uplink ports 308a and 308b on the primary I/O modules 204a/300 and 204b/300 to provide the LAG 900, the primary I/O module engine 304 in the primary I/O modules 204a/300 and/or 204b/300 may operate to generate and transmit link aggregation communications via the uplink ports 308a and 308b on the primary I/O modules 204a/300 and 204b/300. For example, FIG. 9B illustrates how the primary I/O module engine 304 in the primary I/O modules 204a/300 and/or 204b/300 may transmit a link aggregation communication 902 over the link 608 to the leaf switch device 212a, a link aggregation communication 904 v over the link 612 to the leaf switch device 212b, a link aggregation communication 906 over the link 610 to the leaf switch device 212a, and a link aggregation communication 906 over the link 614 to the leaf switch device 212b. In an embodiment, the link aggregation communications 902, 904, 906, and 908 may be provided by Link Aggregation Control Protocol (LACP) communications, although one of skill in the art in possession of the present disclosure will appreciate that other link aggregation communications may fall within the scope of the present disclosure as well.

In this embodiment of decision block 506, the leaf switch engine 404 in the leaf switch device 212a/400 and/or 212b/400 may receive the link aggregation communications from the primary I/O modules 204a and 204b and, in response, the leaf switch engine 404 in the leaf switch device 212a/400 and/or 212b/400 may operate to configure the downlink ports 410a and 410b on the leaf switch devices 212a/400 and 212b/400 as part of a link aggregation group. For example, FIG. 9C illustrates how the leaf switch device 212a/400 and/or 212b/400 may operate at block 506 to configure the downlink ports 410a and 410b on the leaf switch device 212a/400 and/or 212b/400 to provide a Link Aggregation Group (LAG) 910 (e.g., a VLT port channel in the VLT protocol). As such, following block 506, the connection between the network fabrics 202 and 210 provided by the primary I/O modules 204a and 204b and the leaf switch devices 212a and 212b is configured to allow the primary I/O modules 204a and 204b and the leaf switch devices 212a and 212b to exchange communications (e.g., that are generated by and/or directed to the server devices 208a-208d).

Figure 10A:
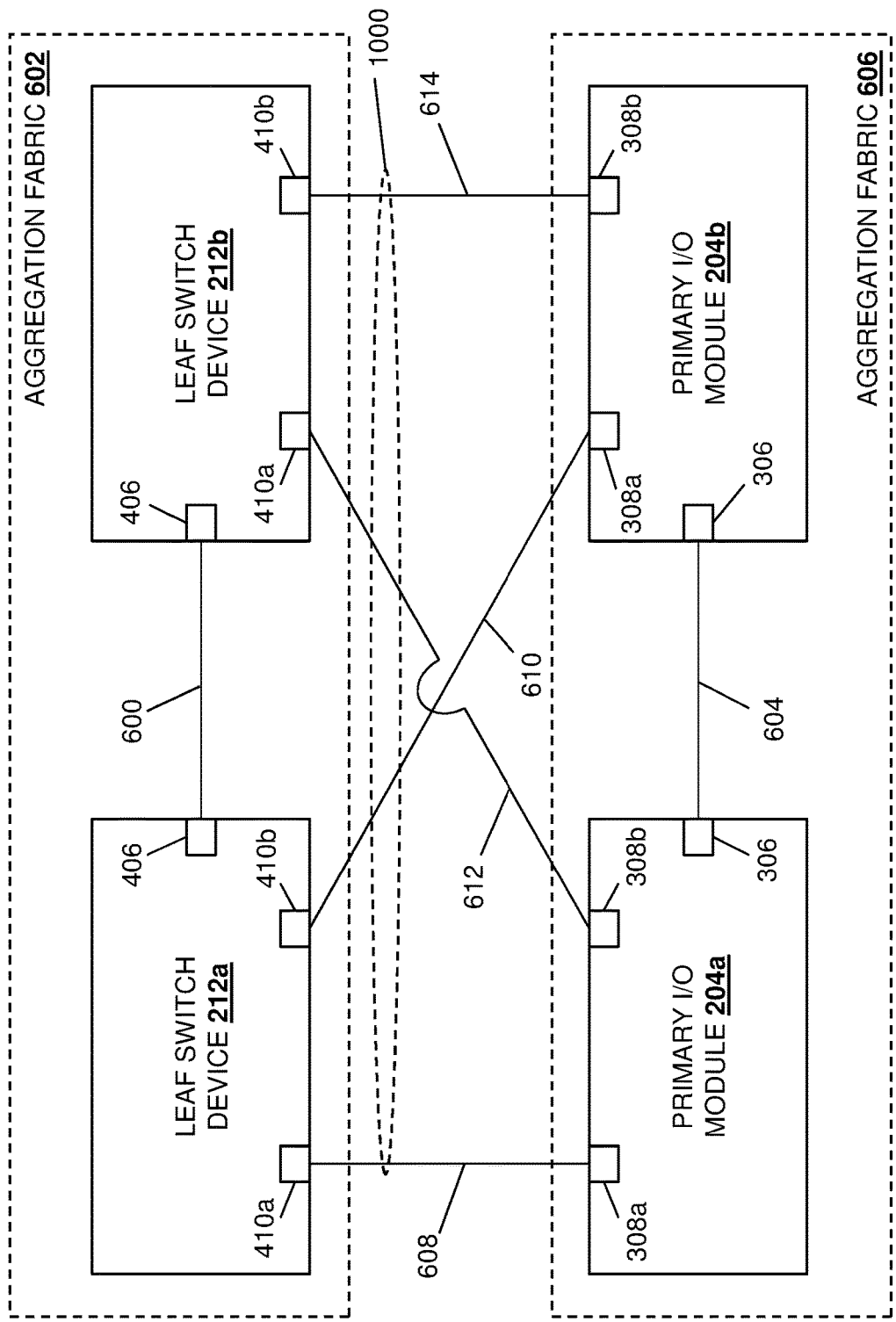
FIG. 10A is a schematic view illustrating an embodiment of the automated multi-fabric link aggregation system of FIG. 6 operating during the method of FIG. 5.
Figure 10B:
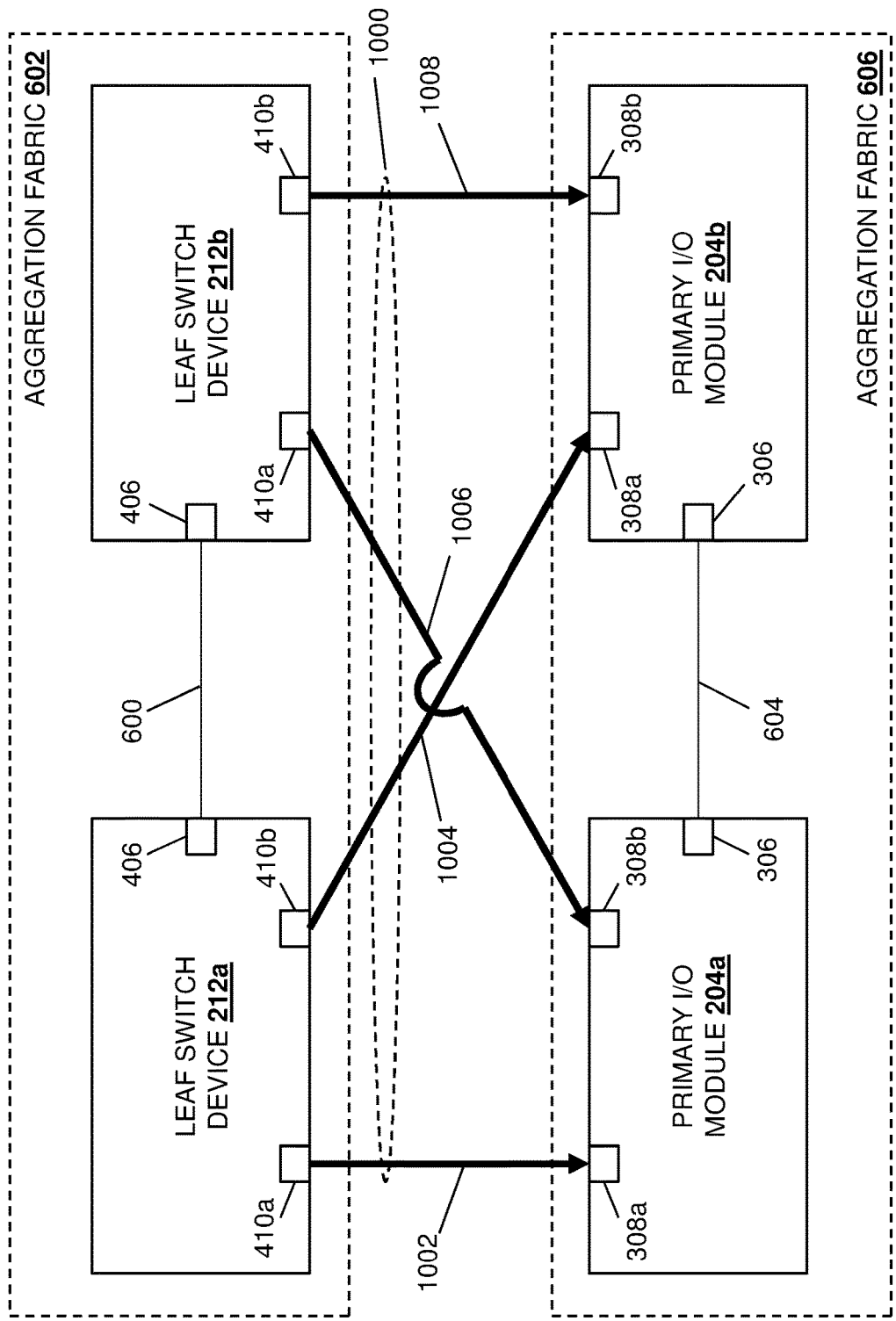
FIG. 10B is a schematic view illustrating an embodiment of the automated multi-fabric link aggregation system of FIG. 6 operating during the method of FIG. 5.
Figure 10C:
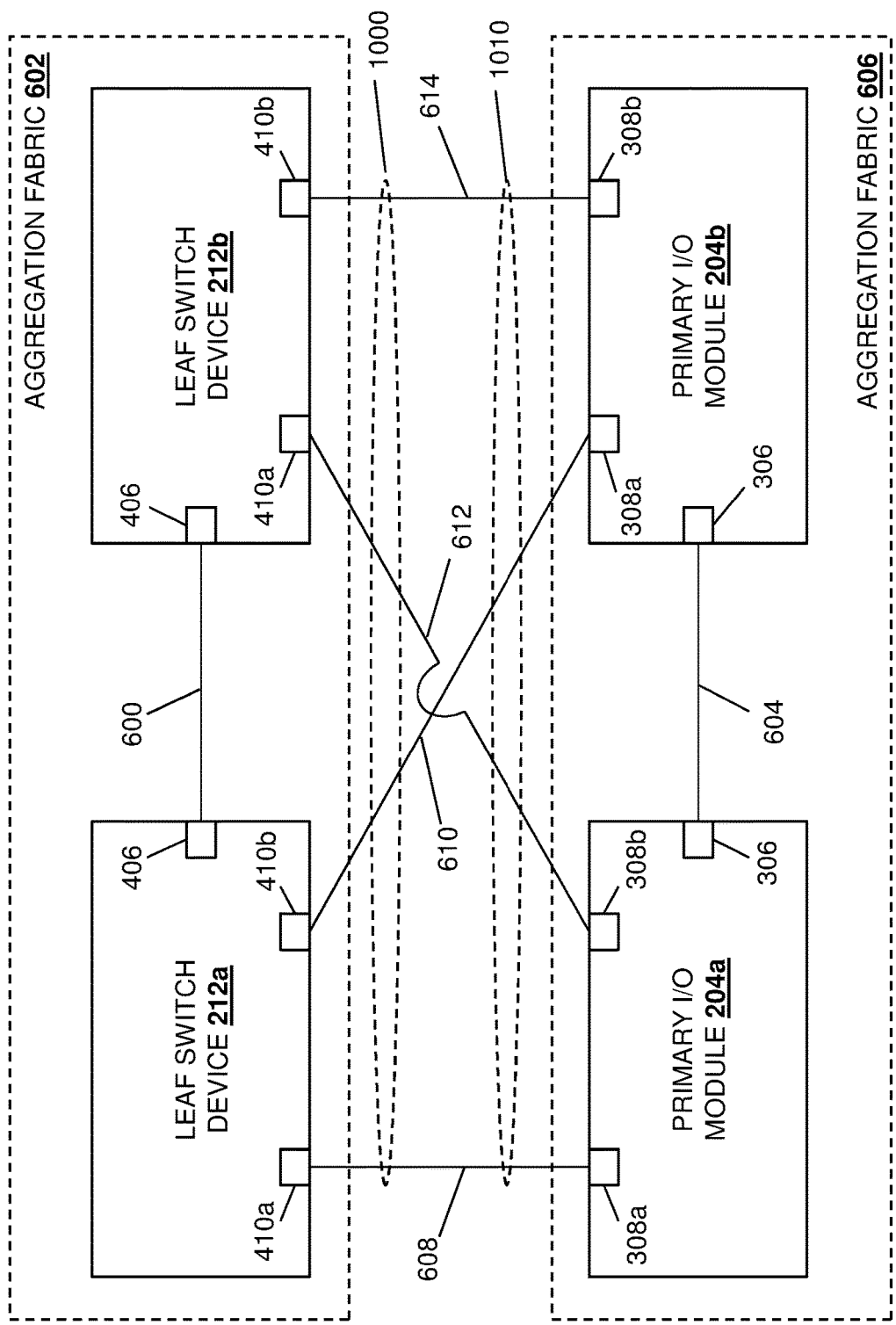
FIG. 10C is a schematic view illustrating an embodiment of the automated multi-fabric link aggregation system of FIG. 6 operating during the method of FIG. 5.
Figure 11:
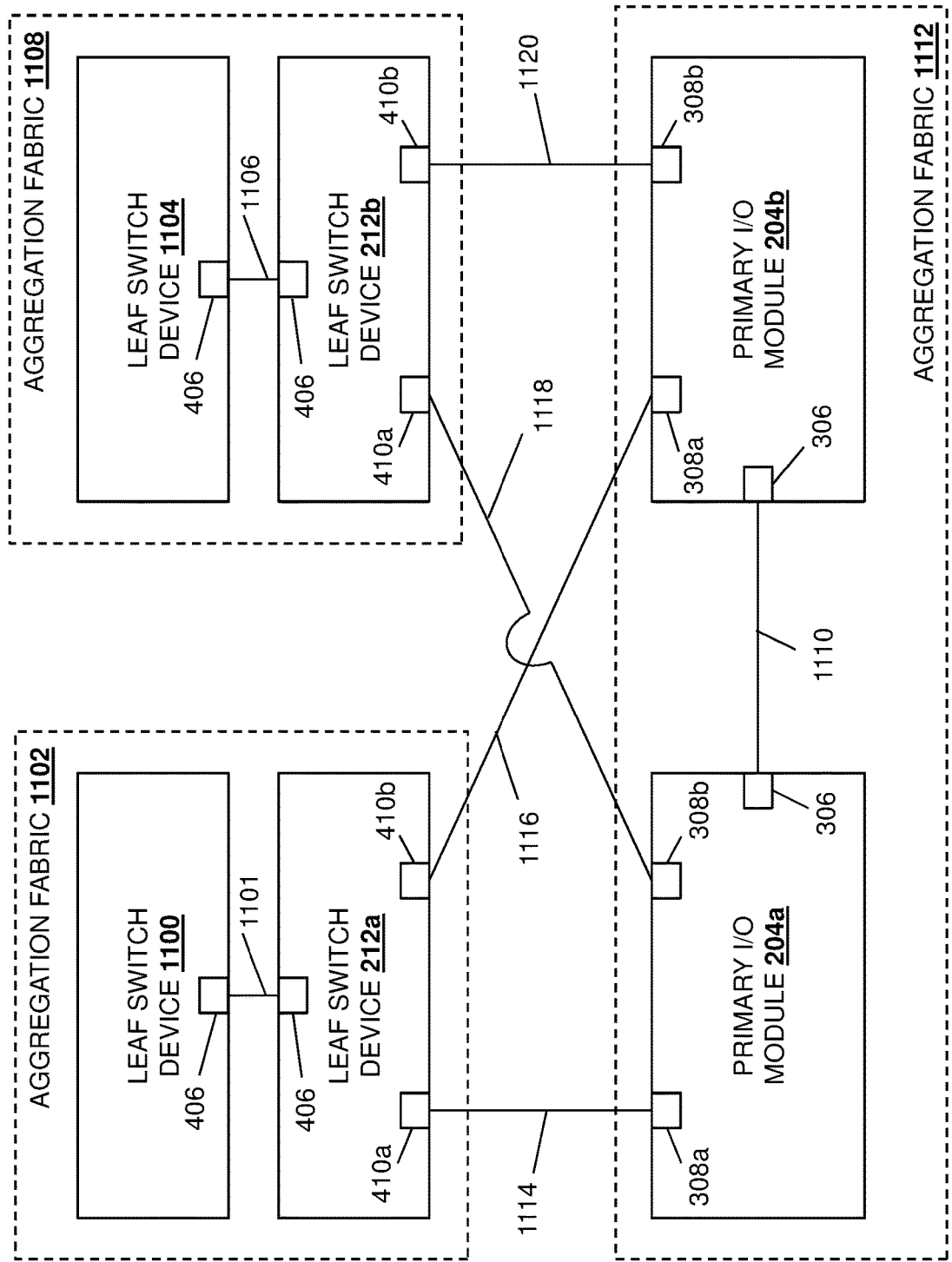
FIG. 11 is a schematic view illustrating an embodiment of the port configuration migration system of FIG. 2 in a second configuration.

In another example illustrated in FIGS. 10A, 10B, and 100, the ports on each of the leaf switch devices 212a and 212b are configured based on the discovery communications exchanged at block 502, and subsequent link aggregation communications are utilized to configure the ports on each of the primary I/O modules 204a and 204b. As such, in some embodiments of decision block 504, the leaf switch engine 404 in the leaf switch devices 212a/400 and/or 212b/400 may determine that the discovery communications received via each of the downlink ports 410a and 410b on the leaf switch devices 212a/400 and 212b/400 include the network fabric identifier for the network fabric 202 and the aggregation fabric identifier for the aggregation fabric 606, and the method 500 proceeds to block 506 where the leaf switch engine 404 in the leaf switch devices 212*a*/400 and/or 212*b*/400 configures the downlink ports 410*a* and 410*b* on the leaf switch devices 212*a*/400 and 212*b*/400 as part of a link aggregation group. In an embodiment, in response to determining that the discovery communications received via each of the downlink ports 410*a* and 410*b* on the leaf switch devices 212*a*/400 and 212*b*/400 include the network fabric identifier for the network fabric 202 and the aggregation fabric identifier for the aggregation fabric 606, the leaf switch engine 404 in the leaf switch device 212*a*/400 and/or 212*b*/400 may reconfigure the downlink ports 410*a* and 410*b* on the leaf switch device 212*a*/400 and 212*b*/400 from a passive mode (e.g., an LACP passive mode) to an active mode (e.g., an LACP active mode), which one of skill in the art in possession of the present disclosure will appreciate may allow for the automatic link aggregation operations discussed below.

For example, FIG. 10A illustrates how the leaf switch engine 404 in the leaf switch devices 212*a*/400 and/or 212*b*/400 may operate at block 506 to configure the downlink ports 410*a* and 410*b* on the leaf switch devices 212*a*/400 and 212*b*/400 to provide a Link Aggregation Group (LAG) 1000 (e.g., a VLT port channel in the VLT protocol). As discussed above, some of the inventors of the present disclosure describe techniques for automatically configuring ports to provide a LAG in U.S. patent application Ser. No. 16/263,431, attorney docket no. 16356.1986US01, filed on Jan. 31, 2019, the disclosure of which is incorporated by reference herein in its entirety. However, while that patent application describes specific techniques for configuring ports in a LAG, one of skill in the art in possession of the present disclosure will appreciate that the downlink ports 410*a* and 410*b* on the leaf switch devices 212*a*/400 and 212*b*/400 may be configured to provide the LAG 1000 in a variety of manners that will fall within the scope of the present disclosure as well.

In this embodiment, following the configuration of the downlink ports 410*a* and 410*b* on the leaf switch devices 212*a*/400 and 212*b*/400 to provide the LAG 1000, the leaf switch engine 404 in the leaf switch devices 212*a*/400 and/or 212*b*/400 may operate to generate and transmit link aggregation communications via the downlink ports 410*a* and 410*b* on the leaf switch devices 212*a*/400 and 212*b*/400. For example, FIG. 10B illustrates how the leaf switch engine 404 in the leaf switch devices 212*a*/400 and 212*b*/400 may transmit a link aggregation communication 1002 over the link 608 to the primary I/O module 204*a*, a link aggregation communication 1004 over the link 612 to the primary I/O module 204*b*, a link aggregation communication 1006 over the link 610 to the primary I/O module 204*a*, and a link aggregation communication 1008 over the link 614 to the primary I/O module 204*b*. In an embodiment, the link aggregation communications 1002, 1004, 1006, and 1008 may be provided by Link Aggregation Control Protocol (LACP) communications, although one of skill in the art in possession of the present disclosure will appreciate that other link aggregation communications may fall within the scope of the present disclosure as well.

In this embodiment of decision block 506, the primary I/O module engine 304 in the primary I/O module 204*a*/300 and/or 204*b*/300 may receive the link aggregation communications from the leaf switch devices 212*a* and 212*b* and, in response, the primary I/O module engine 304 in the primary I/O module 204*a*/300 and/or 204*b*/300 may operate to configure the uplink ports 308*a* and 308*b* on the primary I/O module 204*a*/300 and 204*b*/300 as part of a link aggregation group. For example, FIG. 10O illustrates how the primary I/O module 204*a*/300 and/or 204*b*/300 may operate at block 506 to configure the uplink ports 308*a* and 308*b* on the primary I/O modules 204*a*/300 and/or 204*b*/300 to provide a Link Aggregation Group (LAG) 1010 (e.g., a VLT port channel in the VLT protocol). As such, following block 506, the connection between the network fabrics 202 and 210 provided by the primary I/O modules 204*a* and 204*b* and the leaf switch devices 212*a* and 212*b* is configured to allow the primary I/O modules 204*a* and 204*b* and the leaf switch devices 212*a* and 212*b* to exchange communications (e.g., that are generated by and/or directed to the server devices 208*a*-208*d*). However, while several specific examples of the automated configuration of link aggregations across multiple network fabrics have been described, one of skill in the art in possession of the present disclosure will appreciate that the teachings of the present disclosure may be utilized to configure other multi-fabric link aggregations while remaining within the scope of the present disclosure as well.

If, at decision block 504, it is determined that discovery communications have been received on multiple ports that do not include the same network fabric identifier and aggregation fabric identifier, the method 500 proceeds to block 508 where the multiple ports are configured with separate links.

With reference to FIG. 8, an example of specific connections of the primary I/O modules 204*a* and 204*b* and the leaf switch devices 212*a* and 212*b* is illustrated for purposes of the discussion of block 508 of the method 500 provided below. In the illustrated embodiment, the leaf switch device 212*a* is coupled to a leaf switch device 1100 via their inter-switch port(s) 406 by a link 1101 (e.g., provided by one or more cables between the inter-switch ports 406), and similarly as discussed above the leaf switch engines 404 in the leaf switch devices 212*a*/400 and 1100/400 may be configured, in response to the detecting the link 1101, to configure themselves in as part of an aggregation fabric 1102. For example, the leaf switch devices 212*a*/400 and 1100/400 may utilize the VLT protocol, and in response to detecting a VLT interconnect (VLTi) provided by the link 1101, their leaf switch engines 404 may operate to configure a VLT domain that provides the aggregation fabric 1102. As will be appreciated by one of skill in the art in possession of the present disclosure, a network administrator or other user may provide a variety of configuration information in the leaf switch databases 412 of the leaf switch devices 212*a*/400 and 1100/400 that causes them to configure themselves as part of the aggregation fabric 1102. However, while a specific technique for configuring leaf switch devices in an aggregation fabric has been described, one of skill in the art in possession of the present disclosure will appreciate that leaf switch devices may be configured as part of an aggregation fabric in a variety of manners that will fall within the scope of the present disclosure as well.

Similarly, the leaf switch device 212*b* is coupled to a leaf switch device 1104 via their inter-switch port(s) 406 by a link 1106 (e.g., provided by one or more cables between the inter-switch ports 406), and similarly as discussed above the leaf switch engines 404 in the leaf switch devices 212*a*/400 and 1104/400 may be configured, in response to the detecting the link 1106, to configure themselves in as part of an aggregation fabric 1108. For example, the leaf switch devices 212*a*/400 and 1104/400 may utilize the VLT protocol, and in response to detecting a VLT interconnect (VLTi) provided by the link 1106, their leaf switch engines 404 may operate to configure a VLT domain that provides the aggregation fabric 1108. As will be appreciated by one of skill in the art in possession of the present disclosure, a network administrator or other user may provide a variety of configuration information in the leaf switch databases 412 of the leaf switch devices 212a/400 and 1104/400 that causes them to configure themselves as part of the aggregation fabric 1108. However, while a specific technique for configuring leaf switch devices in an aggregation fabric has been described, one of skill in the art in possession of the present disclosure will appreciate that leaf switch devices may be configured as part of an aggregation fabric in a variety of manners that will fall within the scope of the present disclosure as well.

Similarly, the primary I/O modules 204a/300 and 204b/300 are coupled together via their inter-module port(s) 306 by a link 1110 (e.g., provided by one or more cables between the inter-module ports 306), and similarly as discussed above the primary I/O module engines 304 in the primary I/O modules 204a/300 and 204b/300 may be configured, in response to the detecting the link 1110, to configure themselves in as part of an aggregation fabric 1112. For example, the primary I/O modules 204a/300 and 204b/300 may utilize the VLT protocol, and in response to detecting a VLT interconnect (VLTi) provided by the link 1110, their primary I/O module engines 304 may operate to configure a VLT domain that provides the aggregation fabric 1112. As will be appreciated by one of skill in the art in possession of the present disclosure, a network administrator or other user may provide a variety of configuration information in the primary I/O module databases 312 of the primary I/O modules 204a/300 and 204b/300 that causes them to configure themselves as part of the aggregation fabric 1112. However, while a specific technique for configuring primary I/O modules in an aggregation fabric has been described, one of skill in the art in possession of the present disclosure will appreciate that primary I/O modules may be configured as part of an aggregation fabric in a variety of manners that will fall within the scope of the present disclosure as well.

As illustrated, the leaf switch device 212a/400 may be coupled to each of the primary I/O modules 204a/300 and 204b/300 via a link 1114 between its downlink port 410a and the uplink port 308a on the primary I/O module 204a/300, and a link 1116 between its downlink port 410b and the uplink port 308a on the primary I/O module 204b/300. Similarly, the leaf switch device 212b/400 may be coupled to each of the primary I/O modules 204a/300 and 204b/300 via a link 1118 between its downlink port 410a and the uplink port 308b on the primary I/O module 204a/300, and a link 1120 between its downlink port 410b and the uplink port 308b on the primary I/O module 204b/300.

Figure 12:
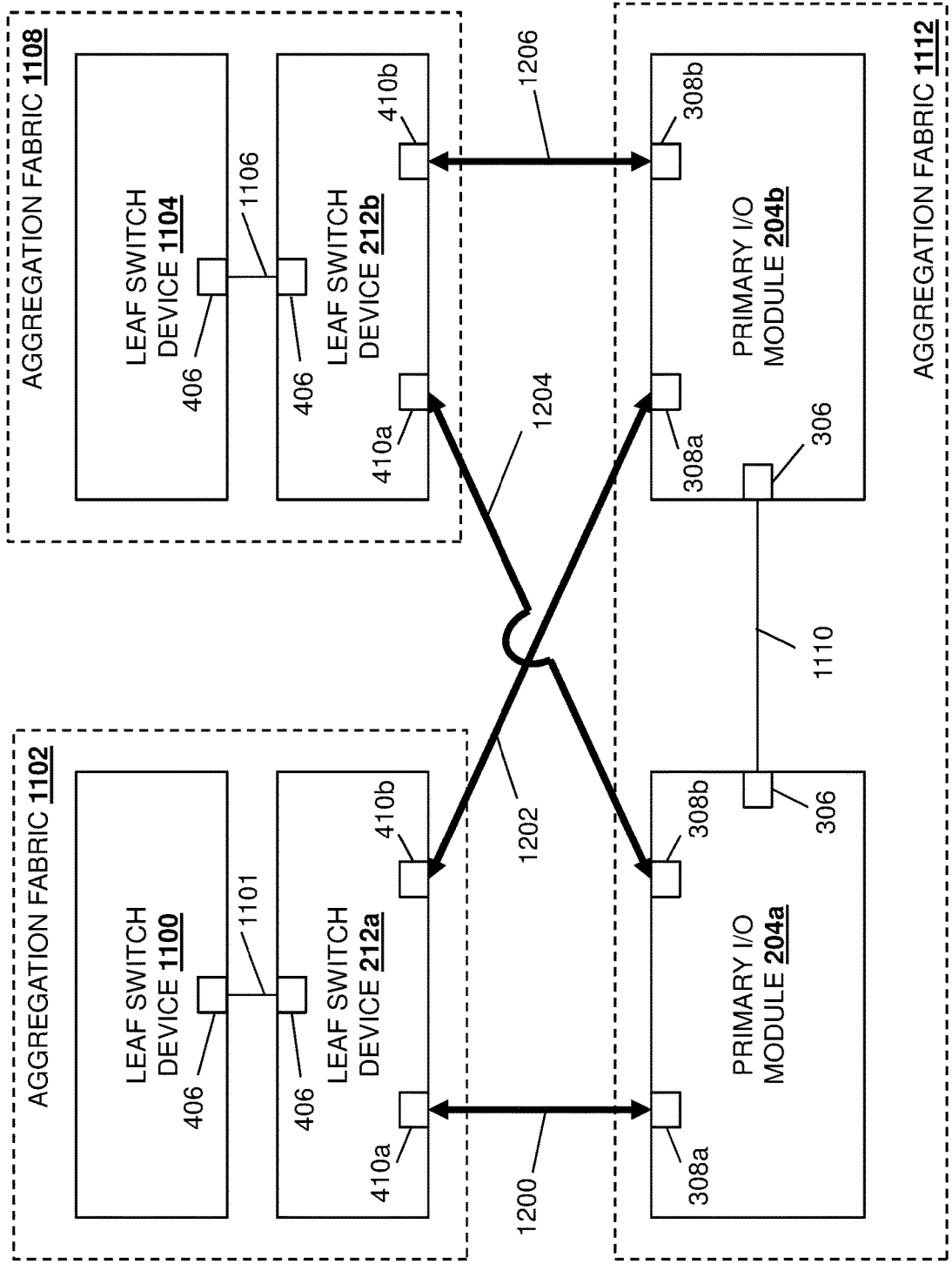
FIG. 12 is a schematic view illustrating an embodiment of the automated multi-fabric link aggregation system of FIG. 11 operating during the method of FIG. 5.

As illustrated in FIG. 12, at block 502, the primary I/O module 204a and the leaf switch device 212a may exchange discovery communications 1200 via the link 1114, the primary I/O module 204a and the leaf switch device 212b may exchange discovery communications 1202 via the link 1116, the primary I/O module 204b and the leaf switch device 212a may exchange discovery communications 1204 via the link 1118, and the primary I/O module 204b and the leaf switch device 212b may exchange discovery communications 1206 via the link 1120. However, at decision block 504, the primary I/O module engine 304 in the primary I/O module 204a/300 will determine that the discovery communications received via its uplink ports 308a and 308b do not include the same aggregation fabric identifier, and the primary I/O module engine 304 in the primary I/O module 204b/300 will determine that the discovery communications received via its uplink ports 308a and 308b do not include the same aggregation fabric identifier (i.e., because the leaf switch device 212a is part of the aggregation fabric 1102, and the leaf switch device 212b is part of the aggregation fabric 1108). As such, in this embodiment of block 508, the primary I/O module engine 304 in the primary I/O modules 204a/300 and/or 204b/300 will configure the ports 308a and 308b on the primary I/O modules 204a/300 and 204b/300 to provide the separate links 1200, 1202, 1204, and 1206.

Thus, systems and methods have been described that provide first aggregated devices in a first network fabric that detect that their ports are connected to second aggregated devices in a second network fabric and, in response, operate to automatically configure those ports as part of a LAG. For example, leaf switch devices having leaf switch device downlink ports are included in a first network fabric and have been aggregated to provide a first aggregation fabric, and each of those leaf switch devices operate to generate first discovery communications that include a first network fabric identifier that identifies the first network fabric, and a first aggregation fabric identifier that identifies the first aggregation fabric. Those leaf switch devices then transmit the first discovery communications via each of the leaf switch device downlink ports to I/O modules via their I/O module uplink ports, with those I/O modules included in a second network fabric and aggregated to provide a second aggregation fabric. The I/O modules receive the first discovery communications from the leaf switch devices via each of the I/O module uplink ports, determine that each first discovery communication received via each of the I/O module uplink ports includes the first network fabric identifier and the first aggregation fabric identifier and, in response, automatically configure the I/O module uplink ports in a first LAG. As such, first aggregated devices in a first network fabric that are connected to second aggregated devices in a second network fabric may operate to automatically configure their ports in a LAG without having to wait for the second aggregated devices in the second network fabric to configure their ports in a LAG, thus saving time, reducing errors, and providing for automated configuration of the connection between the first network fabric and the second network fabric.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automated multi-fabric link aggregation system, comprising:
    a plurality of leaf switch devices that include a plurality of leaf switch device downlink ports, wherein the plurality of leaf switch devices are included in a first network fabric that is managed by a first manager and have been aggregated to provide a first Virtual Link Trunking (VLT) aggregation fabric in the first network fabric, and wherein each of the plurality of leaf switch devices is configured, when the plurality of leaf switch device downlink ports are not aggregated in a Link Aggregation Group (LAG), to:
        generate first discovery communications that include:
            a first network fabric identifier that identifies the first network fabric and
            a first VLT aggregation fabric identifier that identifies the first VLT aggregation fabric; and transmit the first discovery communications via each of the plurality of leaf switch device downlink ports; and a plurality of Input/Output (I/O) modules that include a plurality of I/O module uplink ports, wherein the plurality of I/O modules are included in a second network fabric that is managed by a second manager and have been aggregated to provide a second VLT aggregation fabric in the second network fabric, and wherein each of the plurality of I/O modules is configured to:

receive, via each of the plurality of I/O module uplink ports when the plurality of I/O module uplink ports are not aggregated in a LAG, the first discovery communications from the plurality of leaf switch devices;

determine that each first discovery communication received via each of the plurality of I/O module uplink ports includes the first network fabric identifier and the first VLT aggregation fabric identifier; and automatically configure, in response to determining that each first discovery communication received via each of the plurality of I/O module uplink ports includes the first network fabric identifier and the first VLT aggregation fabric identifier, the plurality of I/O module uplink ports in a first LAG.

2. The system of claim 1, wherein each of the plurality of I/O modules is configured to:

generate second discovery communications that include:
a second network fabric identifier that identifies the second network fabric; and
a second VLT aggregation fabric identifier that identifies the second VLT aggregation fabric; and transmit the second discovery communications via each of the plurality of I/O module uplink ports to the plurality of leaf switch devices.

3. The system of claim 2, wherein each of the leaf switch devices is configured to:

receive, via each of the plurality of leaf switch device downlink ports, the second discovery communications from the plurality of I/O modules;

determine that each second discovery communication received via each of the plurality of leaf switch device downlink ports includes the second network fabric identifier and the second VLT aggregation fabric identifier; and automatically configure, in response to determining that each second discovery communication received via each of the plurality of leaf switch device downlink ports includes the second network fabric identifier and the second VLT aggregation fabric identifier, the plurality of leaf switch device downlink ports in a second LAG.

4. The system of claim 1, wherein the first discovery communications are Link Layer Discovery Protocol (LLDP) communications.

5. The system of claim 1, wherein each of the plurality of I/O modules is configured to:

generate, subsequent to configuring the plurality of I/O module uplink ports in the first LAG, link aggregation communications; and transmit the link aggregation communications via each of the plurality of I/O module uplink ports to the plurality of leaf switch devices.

6. The system of claim 5, wherein each of the leaf switch devices is configured to:

receive, via each of the plurality of leaf switch device downlink ports, the link aggregation communications from the plurality of I/O modules; and automatically configure, in response to receiving the link aggregation communications, the plurality of leaf switch device downlink ports in a second LAG.

7. The system of claim 6, wherein the link aggregation communications are Link Aggregation Control Protocol (LACP) communications.

8. An Information Handling System (IHS), comprising:
a processing system; and
a memory system that is coupled to the processing system and that includes instructions that, when executed by the processing system, cause the processing system to provide an Input/Output (I/O) module engine that is configured to:

receive first discovery communications from a plurality of leaf switch devices that are included in a first network fabric that is managed by a first manager and have been aggregated to provide a first Virtual Link Trunkinq (VLT) aggregation fabric in the first network fabric, wherein the first discovery communications are received via each of a plurality of I/O module uplink ports included on the IHS that is included in a second network fabric that is managed by a second manager and has been aggregated with an I/O module to provide a second VLT aggregation fabric in the second network fabric, and wherein each of the plurality of I/O module uplink ports are connected to respective leaf switch device downlink ports on the plurality of leaf switch devices when the plurality of I/O module uplink ports are not aggregated in a Link Aggregation Group (LAG) and when the respective leaf switch device downlink ports are not aggregated in a LAG;

determine that each first discovery communication received via each of the plurality of I/O module uplink ports includes:
a first network fabric identifier that identifies the first network fabric that includes the plurality of leaf switch devices; and
a first VLT aggregation fabric identifier that identifies the first VLT aggregation fabric that includes the plurality of leaf switch devices; and automatically configure, in response to determining that each first discovery communication received via each of the plurality of I/O module uplink ports includes the first network fabric identifier and the first VLT aggregation fabric identifier, the plurality of I/O module uplink ports in a first LAG.

9. The IHS of claim 8, wherein the I/O module engine is configured to:

generate second discovery communications that include:
a second network fabric identifier that identifies the second network fabric; and
a second VLT aggregation fabric identifier that identifies the second VLT aggregation fabric; and transmit the second discovery communications via each of the plurality of I/O module uplink ports to the plurality of leaf switch devices, wherein the second discovery communications are configured to cause the plurality of leaf switch device downlink ports to be aggregated in a second LAG.

10. The IHS of claim 8, wherein the first discovery communications are Link Layer Discovery Protocol (LLDP) communications.

11. The IHS of claim 8, wherein the I/O module engine is configured to:
  generate, subsequent to configuring the plurality of I/O module uplink ports in the first LAG, link aggregation communications; and
  transmit the link aggregation communications via each of the plurality of I/O module uplink ports to the plurality of leaf switch devices.

12. The IHS of claim 11, wherein the link aggregation communications are Link Aggregation Control Protocol (LACP) communications.

13. The IHS of claim 8, wherein the I/O module engine is configured to:
  provide the plurality of I/O module uplink ports in an active mode.

14. A method for automatically configuring link aggregations in multiple fabrics, comprising:
  receive, by a first Input/Output (I/O ) module, first discovery communications from a plurality of leaf switch devices that are included in a first network fabric that is managed by a first manager and have been aggregated to provide a first Virtual Link Trunking (VLT) aggregation fabric in the first network fabric, wherein the first discovery communications are received via each of a plurality of I/O module uplink ports included on the first I/O module that is included in a second network fabric that is managed by a second manager and has been aggregated with a second I/O module to provide a second VLT aggregation fabric in the second network fabric, and wherein each of the plurality of I/O module uplink ports are connected to respective leaf switch device downlink ports on the plurality of leaf switch devices when the plurality of I/O module uplink ports are not aggregated in a Link Aggregation Group (LAG) and when the respective leaf switch device downlink ports are not aggregated in a Link Aggregation Group (LAG);
  determine, by the I/O module, that each first discovery communication received via each of the plurality of I/O module uplink ports includes:
    a first network fabric identifier that identifies the first network fabric that includes the plurality of leaf switch devices; and a first VLT aggregation fabric identifier that identifies the first VLT aggregation fabric that includes the plurality of leaf switch devices; and
  automatically configure, by the I/O module in response to determining that each first discovery communication received via each of the plurality of I/O module uplink ports includes the first network fabric identifier and the first VLT aggregation fabric identifier, the plurality of I/O module uplink ports in a first LAG.

15. The method of claim 14, further comprising:
  generating, by the I/O module, second discovery communications that include:
    a second network fabric identifier that identifies the second network fabric; and
    a second aggregation fabric identifier that identifies the second VLT aggregation fabric; and transmitting the second discovery communications via each of the plurality of I/O module uplink ports to the plurality of leaf switch devices.

16. The method of claim 15, further comprising:
  receiving, by the plurality of leaf switch devices via each of the plurality of leaf switch device downlink ports, the second discovery communications from the I/O module;
  determining, by the plurality of leaf switch devices, that each second discovery communication received via each of the plurality of leaf switch device downlink ports includes the second network fabric identifier and the second VLT aggregation fabric identifier; and
  automatically configuring, by the plurality of leaf switch devices in response to determining that each second discovery communication received via each of the plurality of leaf switch device downlink ports includes the second network fabric identifier and the second VLT aggregation fabric identifier, the plurality of leaf switch device downlink ports in a second LAG.

17. The method of claim 14, wherein the first discovery communications are Link Layer Discovery Protocol (LLDP) communications.

18. The method of claim 14, further comprising:
  generating, by the I/O module subsequent to configuring the plurality of I/O module uplink ports in the first LAG, link aggregation communications; and
  transmitting, by the I/O module, the link aggregation communications via each of the plurality of I/O module uplink ports to the plurality of leaf switch devices.

19. The method of claim 18, further comprising:
  receiving, by the plurality of leaf switch devices via each of the plurality of leaf switch device downlink ports, the link aggregation communications from the I/O module; and
  automatically configuring, by the plurality of leaf switch devices in response to receiving the link aggregation communications, the plurality of leaf switch device downlink ports in a second LAG.

20. The method of claim 19, wherein the link aggregation communications are Link Aggregation Control Protocol (LACP) communications.

* * * * *